United States Patent
Rhodes et al.

(10) Patent No.: US 12,315,031 B2
(45) Date of Patent: May 27, 2025

(54) HIGH FIDELITY INTERACTIVE SEGMENTATION FOR VIDEO DATA WITH DEEP CONVOLUTIONAL TESSELLATIONS AND CONTEXT AWARE SKIP CONNECTIONS

(71) Applicant: INTEL CORPORATION, Santa Clara, CA (US)

(72) Inventors: Anthony Rhodes, Portland, OR (US); Manan Goel, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 71 days.

(21) Appl. No.: 18/374,508

(22) Filed: Sep. 28, 2023

(65) Prior Publication Data

US 2024/0029193 A1 Jan. 25, 2024

Related U.S. Application Data

(62) Division of application No. 16/773,715, filed on Jan. 27, 2020, now Pat. No. 11,928,753.

(51) Int. Cl.

| | |
|---|---|
| *G06T 1/20* | (2006.01) |
| *G06F 18/241* | (2023.01) |
| *G06T 3/4046* | (2024.01) |
| *G06T 7/11* | (2017.01) |
| *G06T 7/174* | (2017.01) |
| *G06T 9/00* | (2006.01) |
| *G06V 10/26* | (2022.01) |

(Continued)

(52) U.S. Cl.
CPC .............. *G06T 1/20* (2013.01); *G06F 18/241* (2023.01); *G06T 3/4046* (2013.01); *G06T 7/11* (2017.01); *G06T 7/174* (2017.01); *G06T 9/002* (2013.01); *G06V 10/26* (2022.01); *G06V 10/764* (2022.01); *G06V 20/46* (2022.01); *G06V 20/49* (2022.01); *G06T 2207/10016* (2013.01); *G06T 2207/20221* (2013.01)

(58) Field of Classification Search
CPC ... G06T 1/20; G06T 7/11; G06T 7/174; G06T 3/4046; G06T 9/002; G06T 2207/10016; G06T 2207/20221; G06V 20/49; G06V 20/46; G06V 10/26; G06V 10/764; G06F 18/241

See application file for complete search history.

(56) References Cited

U.S. PATENT DOCUMENTS

| | | |
|---|---|---|
| 11,676,278 B2 | 6/2023 | Rhodes et al. |
| 2020/0143171 A1 | 5/2020 | Lee et al. |

OTHER PUBLICATIONS

United States Patent and Trademark Office, "Non-Final Office Action," issued in connection with U.S. Appl. No. 16/584,709, dated Oct. 27, 2022, 5 pages.

(Continued)

*Primary Examiner* — Mark Roz
(74) *Attorney, Agent, or Firm* — Hanley, Flight & Zimmerman, LLC

(57) ABSTRACT

Techniques related to automatically segmenting video frames into per pixel fidelity object of interest and background regions are discussed. Such techniques include applying tessellation to a video frame to generate feature frames corresponding to the video frame and applying a segmentation network implementing context aware skip connections to an input volume including the feature frames and a context feature volume corresponding to the video frame to generate a segmentation for the video frame.

15 Claims, 13 Drawing Sheets

(51) Int. Cl.
　　　*G06V 10/764*　　(2022.01)
　　　*G06V 20/40*　　(2022.01)

(56) References Cited

OTHER PUBLICATIONS

Notice of Allowance from U.S. Appl. No. 16/773,715 notified Jun. 28, 2023, 12 pgs.
Restriction Requirement from U.S. Appl. No. 16/773,715 notified Mar. 23, 2023, 6 pgs.
Chacon, Mario I., et al., "Simplified SOM-Neural Model for Video Segmentation of Moving Objects", Proceedings of International Joint Conference on Neural Networks, Atlanta, GA, Jun. 14-19, 2009, 7 pgs.
Fayyaz, Mohsen, et al., "STFCN: Spatio-Temporal FCN for Semantic Video Segmentation", 2016, 17 pgs.
He, K., et al., "Deep Residual Learning for Image Recognition", IEEE Conference on Computer Vision and Pattern Recognition, 2016, 9 pages.
Huang, et al., "Densely Connected Convolutional Networks", IEEE Conference on Computer Vision and Pattern Recognition (CVPR); 2017, 9 pages.
Jain, et al., FusionSeg: Learning to combine motion and appearance for fully automatic segmentation of generic objects in video , 2017 IEEE Conference on Computer Vision and Pattern Recognition, 10 pages.
Koprinska, Irena, et al., "Temporal video segmentation: A survey", Signal Processing Image Communication 16 (2001), 24 pgs.
Li, et al., "Interactive Image Segmentation with Latent Diversity", Intel Labs; CVPR 2018.
Rhodes, A., et al., "High Fidelity Interactive Video Segmentation Using Tensor Decomposition, Boundary Loss, Convolutional Tessellations, and Context-Aware Skip Connections", CVMP 2020, Dec. 7-8, 2020, Virtual Event, United Kingdom.
Valipour, Sepehr, et al., "Recurrent Fully Convolutional Networks for Video Segmentation", 2017 IEEE Winter Conference on Applications of Computer Vision, 8 pgs.
Xu, Yu-Syuan, et al., "Dynamic Video Segmentation Network", IEEE 2018, 10 pgs.

1101

1102

HIGH FIDELITY INTERACTIVE SEGMENTATION FOR VIDEO DATA WITH DEEP CONVOLUTIONAL TESSELLATIONS AND CONTEXT AWARE SKIP CONNECTIONS

CLAIM FOR PRIORITY

This application is a divisional of, and claims the benefit of priority to, U.S. patent application Ser. No. 16/773,715, filed on Jan. 27, 2020, titled "HIGH FIDELITY INTERACTIVE SEGMENTATION FOR VIDEO DATA WITH DEEP CONVOLUTIONAL TESSELLATIONS AND CONTEXT AWARE SKIP CONNECTIONS," which is incorporated by reference in its entirety.

BACKGROUND

In interactive video segmentation, user input is received that indicates, via user clicks on an image, a foreground object or object of interest (e.g., positive clicks) and a background (e.g., negative clicks) of the image. The user input is then utilized to automatically render pixel-level segmentation of the object of interest from the background throughout the video clip. Such interactive video segmentation may be used in rotoscoping (e.g., the process of transferring an image into another video sequence) or other applications. Notably, the resultant semantic segmentation data is useful in a variety of contexts such as visual effects applications. For example, automatic video segmentation may advantageously replace labor intensive and costly rotoscoping techniques that are used in media, film, and related industries.

Current semantic segmentation techniques include the use of hand-crafted features and distance metrics as well as the use of convolutional neural networks to segment a still image into, for example, foreground and background regions. However, there is an ongoing interest in improved high fidelity segmentation. It is with respect to these and other considerations that the present improvements have been needed. Such improvements may become critical as the desire to apply high fidelity segmentation in video becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
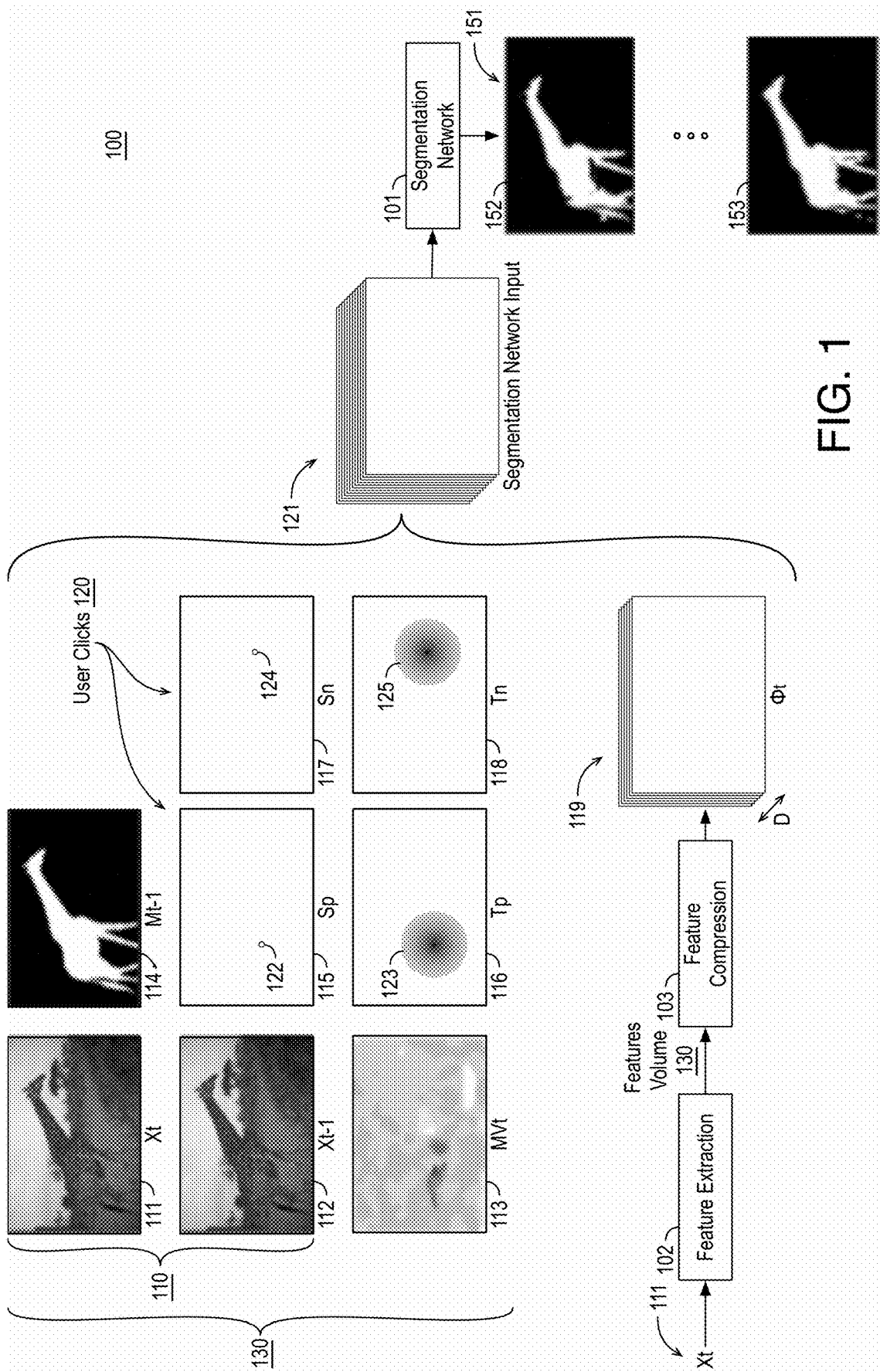
FIG. 1 illustrates a system for segmentation of a video frame into one or more segmentation frames.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Methods, devices, apparatuses, computing platforms, and articles are described herein related to high fidelity semantic segmentation in video using deep convolutional tessellations and context aware skip connections.

As described above, it may be advantageous to semantically segment each video frame of a video sequence into, for example, foreground and background regions. Notably, interactive video segmentation may be frames as the problem of applying user input (e.g., positive and negative clicks and/or approximate segmentations) to automatically render a pixel-level segmentation of an object of interest throughout a video clip. For example, a user may provide clicks on a first video frame of a sequence to indicate locations in the frame that include an object of interest (e.g., positive clicks) and background locations or locations that do not include the object of interest (e.g., negative clicks). Using such user provided information, it is desirable to segment each video frame into a region having the object of interest and another region having the background. Accurate high fidelity segmentation data is desirable in a variety of visual effects contexts. Such segmentation data may include any pixel wise information (or dense region information such as 2×2 pixel regions) that indicates whether the pixel is in the object of interest or the background. Such data may be binary or may indicate a likelihood or probability (e.g., from 0 to 1, inclusive) that the pixel is in the object of interest. Such probability data may be used to generate a binary mask using a threshold of 0.5, for example. As used herein, the term segmentation or segmentation frame may include any data structure providing such pixel wise information or dense region information.

As discussed herein, a segmentation network (segmentation convolutional neural network (CNN)) is used to generate one or more segmentations for a current video frame based on application of the segmentation network to an input volume. The input volume includes a number of frames. As used herein, the term frame in the context of a CNN input indicates a 2D data structure having a feature value for each pixel of the frame. Such feature values include, for a video frame for example, red values, green values, and blue values (e.g., an input frame for each of the RGB color values), an indicator of a positive user click or projected positive user click (e.g., a value of 1 at locations of a positive user click and values of 0 elsewhere), values indicative of a distance from the pixel to a positive or negative user click, values indicative of motion (e.g., per pixel velocity motion vectors), feature values compressed from layers of an object classification CNN, and so on. Such data structures are discussed further herein.

In some embodiments, the segmentation network input volume includes a context feature volume (or, simply, a feature volume) and a number of feature frames or deep feature frames. The term context feature volume indicates features that are from and provide context to the current video frame. For example, the context feature volume may include one or more of a current video frame, a temporally previous video frame, a user input frame including one or more indicators of an object of interest in the current video frame, a user input frame including one or more indicators of a background of the current video frame, a positive distance transform frame (including information regarding pixel proximity to indicators of an object of interest), a negative distance transform frame (including information regarding pixel proximity to indicators of background), a motion frame including motion indicators indicative of motion from the previous video frame to the current video frame.

The feature frames include features compressed from feature layers of an object classification convolutional neural network. That is, the object classification convolutional neural network is applied to the current video frame and, for some or all of the convolutional layers of the object classification convolutional neural network, feature values are attained. The feature values may have the same resolution as the current video frame, for example, and a number of feature values are attained for each pixel of the current video frame. Notably, a number of feature values may be attained for each pixel at each convolutional layer, depending on the depth of the output volume from the convolutional layer. For example, for a convolutional layer having a depth of 75, 75 feature values are attained for each pixel. Thereby, hundreds or even more than a thousand (e.g., 1,500) feature values may be attained for each pixel. The feature values for each pixel may be characterized as a hypercolumn and all of the hypercolumns taken together may be characterized as an object classification convolutional neural network, an output volume, a feature volume, etc. The full feature volume may then be compressed using Tucker decomposition to generate the feature frames that, as discussed, are compressed from the feature layers of the object classification convolutional neural network.

The context feature volume (e.g., a number of context frames) are then combined (e.g., concatenated) with the deep feature frames and provided as an input to the segmentation network. In some embodiments, the deep feature frames are generated using tessellation techniques. Such tessellation techniques include resizing (e.g., upsampling) the current video frame to a resized current video frame using interpolation techniques such that the resized current video frame includes a grid of sub-images each having dimensions that correspond to the dimensions used to train the object classification convolutional neural network. For example, if the object classification convolutional neural network is trained on 224×224 images, the resized current video frame is upsampled to include a grid of 224×224 sub-images such that the sub-images fill the entirety of the resized current video frame. The sub-images are then processed by the object classification convolutional neural network, optionally in parallel, and, for each pixel, a number of feature values (e.g., a hypercolumn) is attained. The hypercolumns may then be merged to form a feature volume having a resolution of the resized current video frame and a depth of the number of feature values. As used herein, the term resolution with respect to a frame or a volume indicates the height and width of the frames in the spatial or pixel domain while the depth indicates a value or feature for each pixel. For example, an RGB frame of 1920×1080 has a resolution of 1920×1080 and a depth of 3 (one for each of R, G, and B) while a feature volume for a sub-image having 224×224 pixels and having an overall volume of 224×224×75 has a resolution of 224×224 (corresponding to the height and width of in the pixel space or domain) and a depth of 75 features. Notably, the input sub-image having a volume of 224×224×3 would have a resolution of 224×224 (e.g., pixel resolution) and a depth of 3 (one for each of R, G, and B).

Returning to discussion of the merged hypercolumns, the resultant feature volume having a resolution of the resized current video frame may then be resized (or downsampled) to the resolution of the current video frame. The downsampled feature volume may then be compressed, as discussed, to generate feature frames. Notably, compression or decomposition of the downsampled feature volume may greatly reduce the number of features for improved computational efficiency while retaining important feature information for segmentation.

The combined context feature volume and deep feature frames (whether generated using tessellation or not) may be characterized as a segmentation network input volume. The pretrained segmentation network is then applied to the segmentation network input volume to generate one or more segmentations for the current frame. In some embodiments, the segmentation network includes context aware skip connections. As used herein, the term context aware skip connection indicates a skip connection that combines (e.g., concatenates) an output from a previous convolutional layer with the previously discussed context feature volume to generate a convolutional layer input volume for an immediately next convolutional layer of the segmentation network. Notably, the skip connection does not combine the output from the previous convolutional layer with another output from another previous convolutional layer. Instead, the context aware skip connections discussed herein provide the context feature volume (e.g., current video frame, previous video frame, etc.) as input to some or all of the convolutional layers of the segmentation network. Thereby, some or all of the convolutional layers have full context information (e.g., without loss from application of any previous convolutional layers of the network) for improved segmentation fidelity. In some embodiments, both tessellation techniques and context aware skip connections may be applied.

The techniques discussed herein provide architectural improvements to deep learning techniques for the problem of interactive object segmentation in video data. Such techniques may provide an end-to-end high-fidelity deep learning workflow using a dense convolutional network, high-resolution, dense image features rendered with a convolutional tessellation procedure and context-aware skip connections. Such techniques provide improved high-fidelity segmentation for use in a variety of contexts.

FIG. 1 illustrates a system 100 for segmentation of a video frame 111 into one or more segmentation frames 151, arranged in accordance with at least some implementations of the present disclosure. Notably, a convolutional neural network (CNN) input or segmentation network input 121 may be input to a segmentation network 101 to attain one or multiple segmentation frames 151 of current video frame 111. As used herein, the term segmentation network or segmentation CNN indicates a CNN that generates a single segmentation or multiple candidate segmentations based on a segmentation input such that each segmentation indicates a probability that each pixel thereof is in an object of interest. The probability may be binary (e.g., 1 for in the object of interest or 0 for outside the object of interest) or scaled to a particular range (e.g., from 0 to 1 inclusive).

As shown in FIG. 1, system 100 includes segmentation network 101, a feature extraction module 102 and a feature compression module 103. System 100 may include a processor, memory, etc. implemented via any suitable form factor device as discussed herein. For example, system 100 may be implemented as a personal computer, a laptop computer, a tablet, a phablet, a smart phone, a digital camera, a gaming console, a wearable device, a display device, an all-in-one device, a two-in-one device, or the like. For example, system 100 may perform segmentation as discussed herein. In some embodiments, system 100 further includes one or more image capture devices to capture input video 110 although such input video may be received from another device.

Segmentation network input 121 includes a context feature volume 130 and feature frames 119 ($0t$). For example, context feature volume 130 and feature frames 119 may be concatenated to form segmentation network input 121. Notably, context feature volume 130 may include stack of frames and, likewise, multiple feature frames 119 may be characterized as a volume. Furthermore, the frames of context feature volume 130 and each of feature frames 119 may have the same resolution (e.g., that of current video frame 111).

As shown, context feature volume 130 may include current video frame 111 (Xt) of input video 110, a previous video frame 112 (Xt−1) of input video 110, a motion frame 113 (MVt), a previous segmentation frame 114 (Mt−1), an object of interest indicator frame 115 (or positive indicator frame) (Sp), a background indicator frame 117 (or negative indicator frame) (Sn), a positive distance transform frame 116 (or distance to object of interest indicator frame) (Tp), and a negative distance transform frame 118 (or distance to background indicator frame) (Tn). Each of such frames of context feature volume 130 are discussed herein below. Furthermore, feature frames 119 include features compressed from layers of an object classification convolutional neural network as applied to the current video frame, as discussed further herein below.

System 100 receives input video 110 and user click indicators 120. Input video 110 may include any suitable video frames, video pictures, sequence of video frames, group of pictures, groups of pictures, video data, or the like in any suitable resolution. For example, the video may be video graphics array (VGA), high definition (HD), Full-HD (e.g., 1080p), 2K resolution video, 4K resolution video, 8K resolution video, or the like, and the video may include any number of video frames, sequences of video frames, pictures, groups of pictures, or the like. In some embodiments, input video 110 is downsampled prior to CNN processing. Techniques discussed herein are discussed with respect to video frames for the sake of clarity of presentation. However, such frames may be characterized as pictures, video pictures, sequences of pictures, video sequences, etc. In some embodiments, input video has three channels such as RGB channels, although other formats such as YUV, YCbCR, etc. may be used. Notably, as used herein, when part of context feature volume 130, a video frame (current or previous) may include a single frame (e.g., a luma frame) or multiple frames (e.g., one frame for the R channel, one frame for the G channel, and one frame for the B channel).

Previous video frame 112 may be any temporally prior or previous (in capture and display order) with respect to current video frame 111 such as an immediately temporally prior frame such that there are no intervening frames between previous video frame 112 and current video frame 111.

As discussed, system 100 also receives user click indicators 120, which are indicative of locations within or inclusive of an object of interest (e.g., within the giraffe), which are characterized as positive clicks, and locations outside of or exclusive of the object of interest (e.g., outside the giraffe). As used herein the term object of interest indicates any object within an image that a user desires to segment from the remainder (e.g., background) of the image. Often, an object of interest is continuous in that it has a single border and forms an unbroken whole within the border. The object of interest may be any object, person, animal, etc. The user input may be received using any suitable technique or techniques. In some embodiments, in place of such user click indicators 120, locations in and out of the object of interest may be attained using an object recognition CNN or other machine learning techniques. Furthermore, as discussed, user click indicators 120 may be received only for a first video frame of input video 110. For subsequent frames of input video 110 positive locations such as positive location 122 (e.g., a location of a positive indicator indicative of a location within the object of interest) within an object of interest indicator frame 115 may be projected from the initial user click locations. For example, for object of interest indicator frame 115, positive location 122 may be projected from a seed positive location in an initial object of interest frame such that the seed positive location was user provided. In an embodiment, projecting a positive (or negative) location includes translating the location according to a motion vector (indicating per pixel velocity) of motion frame 113 that corresponds to the location (e.g., a collocated motion vector, an average of motion vectors in a vicinity around the location, etc.).

Similarly, negative location 124 (e.g., a location of a negative indicator indicative of a location exclusive of the object of interest) within a background indicator frame 117 may be projected from the initial user click locations. For example, for background indicator frame 117, negative location 124 may be projected from a seed negative location in an initial background frame such that the seed negative location was user provided. Although illustrated with respect to a single positive location 122 and a single negative location 124, any number of positive and negative locations may be used.

Object of interest indicator frame 115 may include any suitable data structure including indicators indicative of locations (e.g., one or more indicators corresponding to one or more locations) within an object of interest such as a first value (e.g., 1) for pixel locations identified as an object of interest location and a second value (e.g., 0) for all other pixel locations. Similarly, background indicator frame 117 may include any suitable data structure including indicators indicative of locations within the background and exclusive of the object of interest such as a first value (e.g., 1) for pixel locations identified as in the background and a second value (e.g., 0) for all other pixel locations. For example, object of interest indicator frame 115 and background indicator frame 117 include indicators of an object of interest and a background such that the indicators indicate (e.g., using a first value) pixels that are inclusive of the object of interest and background, respectively.

Motion frame 113 may include any data structure indicative of motion from previous video frame 112 to current video frame 111. For example, motion frame 113 includes indicators indicative of motion from previous video frame 112 to current video frame 111 such as per pixel velocity motion vectors (e.g., a motion vector for each pixel thereof) or other indicators of motion. Furthermore, motion frame 113 may be generated using any suitable technique or techniques such as dense optical flow techniques. In an embodiment, context feature volume 130 such that segmentation network 101 receives dense optical flow features determined between previous video frame 112 and current video frame 111 applied over the image space.

Positive distance transform frame 116 and negative distance transform frame 118 may be generated from object of interest indicator frame 115 and background indicator frame 117, respectively. Positive distance transform frame 116 and negative distance transform frame 118 may include any suitable data structures indicative of proximity to locations of positive and negative indicators within object of interest indicator frame 115 and background indicator frame 117. In an embodiment, positive distance transform frame 116 includes, for each pixel thereof, a value indicative of a minimum distance to any of the location(s) of positive indicators in object of interest indicator frame 115. Similarly, in an embodiment, negative distance transform frame 118 includes, for each pixel thereof, a value indicative of a minimum distance to any of the location(s) of negative indicators in background indicator frame 117. In an embodiment, each value of positive distance transform frame 116 and negative distance transform frame 118 are determined as shown with respect to Equations (1):

$$T_p(p) = \min_{q \in S_p} \|p - q\|_2 \qquad (1)$$
$$T_n(p) = \min_{q \in S_n} \|p - q\|_2$$

where Tp is positive distance transform frame 116, Tn is negative distance transform frame 118, p is any pixel location within positive distance transform frame 116 or negative distance transform frame, q is a closest positive indicator location (e.g., positive location 122 in object of interest indicator frame 115) or negative indicator location (e.g., negative location 124 in object of interest indicator frame 115). In the example of Equations (1), the per pixel minimum distances are determined as Euclidean distances, however any suitable distance measure may be used.

As shown with respect to positive distance transform frame 116, application of Equations (1) generates a region 123 around the collocated position with respect to positive location 122 such that region 123 has larger values moving concentrically away from the collocated position with respect to positive location 122. Although discussed with respect to small values at the collocated position with respect to positive location 122 and larger values moving away therefrom, alternatively larger values may be used at the collocated position with respect to positive location 122 with values becoming smaller moving away therefrom. For example, the inverse of Equations (1) may be used, etc. Similarly, application of Equations (1) generates a region 125 around the collocated position with respect to negative location 124 such that region 125 again has larger values moving concentrically away therefrom although the inverse may also be used. As will be appreciated, application of multiple positive locations 122 (or negative locations 124)

provides for additional regions 123 (or regions 125) that may be overlapping. For example, positive distance transform frame 116 and negative distance transform frame 118 provide heat maps or contours regarding distance to a closest positive or negative location to guide a CNN in areas likely to be an object of interest or a background region.

Furthermore, segmentation network input 121 includes previous segmentation frame 114, which is a segmentation corresponding to previous video frame 112. Notably, for a first frame of input video 110, a still image segmentation CNN and a still image selection CNN or an object recognition CNN may be used to generate an initial segmentation frame. Subsequent segmentation frames are generated by segmentation network 101 as discussed herein. Previous segmentation frame 114 may include any suitable data structuring indicating segmentation such as per pixel values indicating, for each pixel, the likelihood that the pixel is in an object of interest such as a value ranging from 0 to 1, inclusive, or a value of 0 or 1.

Feature frames 119 are generated for inclusion in segmentation network input 121 such that feature frames 119 each include features compressed from layers of an object classification convolutional neural network as applied to the current video frame. As used herein, the term feature or feature value indicates a value that is part of a feature map or feature frame such that all features in a feature map or frame correspond in that they are attained via the same processing such as application of a CNN, compression, etc. Notably, feature frames 119 may include many (e.g., about 700) feature frames with each frame including per pixel features at the resolution of current video frame 111 such that feature frames 119 are compressed from context feature volume 130 (e.g., about 1400) at a compression rate such as 50%. Although discussed with respect to a 50% compression rate, any rate may be used such as reduction of feature frames by 30% to 40%, reduction of feature frames by 40% to 60%, or the like.

In some embodiments, feature frames 119 are generated by applying an object classification CNN to current video frame 111, retrieving, for each pixel of current video frame 111, multiple values each from one of the layers of the classification convolutional neural network to generate a hypercolumn of feature values for each pixel via feature extraction module 102, and compressing the hypercolumns to feature frames 119 via feature compression module 103. Taken together, the hypercolumn of feature values from the object classification CNN as applied by feature extraction module 102 define multiple feature maps that are subsequently compressed by feature compression module 103 to fewer feature maps. Looking at the application of the object classification CNN in another way, after application, multiple feature maps may be retrieved from the object classification CNN such that each feature map corresponds to a layer of the object classification CNN with each feature map having a feature value corresponding to a pixel of current video frame 111.

In some embodiments, tessellation techniques are applied by feature extraction module 102 to generate features volume 130. In some embodiments, prior to application of the object classification CNN, current video frame 111 is resized to a resized current video frame such that the resized current video frame includes a grid of sub-images each having a size or dimensions corresponding to the size or dimensions of image that is accepted for processing by the object classification CNN (e.g., the size or dimensions of image for which the object classification CNN is pretrained). The object classification CNN is then applied, optionally at least partially in parallel, separately to each of the sub-images and, as discussed above, a hypercolumn of feature values are then retrieved for each pixel of each of the sub-images. The merged hypercolumns provide a feature volume that may be resized (e.g., downsampled) to form features volume 130 such that features volume 130 has a size or resolution equal to that of current video frame 111 in the pixel domain while having any number of feature values (e.g., about 1400 or about 1500). Feature compression module 103 may then compress features volume 130 to generate feature frames 119. Notably, such techniques provide significantly higher feature resolutions for improved segmentation results.

As discussed, an object classification CNN is applied to current video frame 111 and features volume 130 is extracted from layers of the object classification CNN. As used herein, the term object classification CNN indicates any CNN used to perform object detection and/or classification on an input image. Although discussed with respect to an object classification CNN, any pretrained CNN may be used. In an embodiment, the object detection CNN is a pretrained CNN such as the VGG-19 CNN. In an embodiment, features volume 130 are feature maps extracted from convolutional layers of the object detection CNN. That is, feature maps from convolutional layers may be copied and stacked to form features volume 130, which includes a volume of pixel wise features. For example, for each pixel, a column of features (one from each of the extracted feature maps) may be characterized as a hypercolumn. The hypercolumns, taken together, provide a volume of pixel wise features for current video frame 111.

Figure 2:
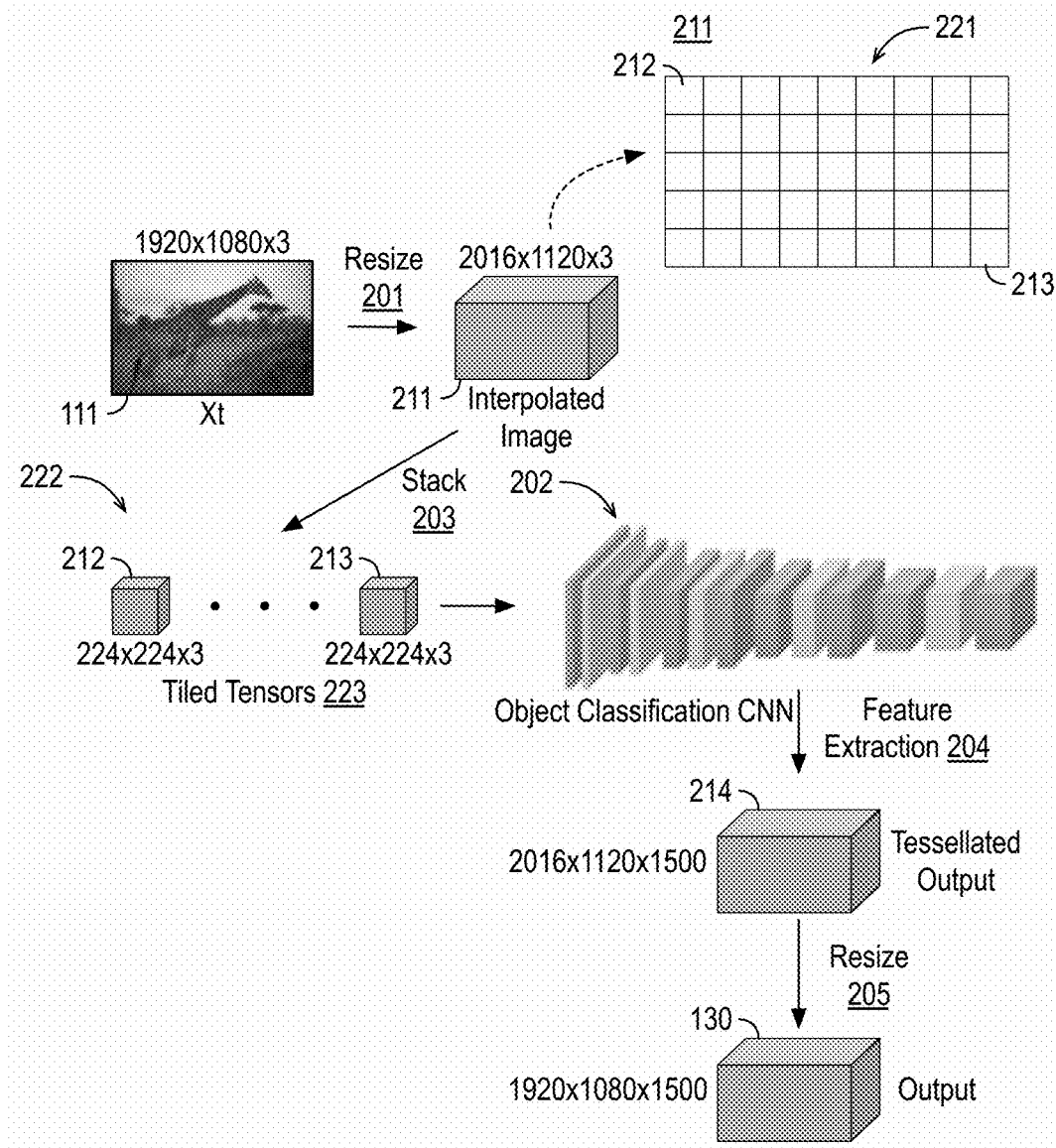
FIG. 2 illustrates exemplary deep convolutional tessellation techniques applied to a current video frame to generate a features volume.

FIG. 2 illustrates exemplary deep convolutional tessellation techniques applied to current video frame 111 to generate features volume 130, arranged in accordance with at least some implementations of the present disclosure. For example, the operations discussed with respect to FIG. 2 may be performed by feature extraction module 102. As shown in FIG. 2, current video frame 111 is received for processing. In the illustrated embodiment, current video frame 111 has a resolution of 1920×1080 and a depth of 3 (e.g., a red image plane, a green image plane, and a blue image plane). However, current video frame 111 may have any suitable resolution generalized as $w_I \times h_I$ (with I representing input). Notably, object classification CNN 202 may be pretrained to accept and process images of a particular size or resolution (e.g., having particular dimensions). For example, large-scale, pre-trained deep CNN models are trained on relatively low resolution image data with an average resolution of about 469×387, which results in relatively low fidelity features, as is illustrated with respect to FIG. 5. In the illustrated embodiment, object classification CNN 202 is configured to process 224×224 resolution images having a depth of 3 (e.g., for RGB). However, object detection may be configured and pretrained to process any suitable resolution image (less than the resolution of current video frame 111) generalized as $w_M \times h_M$ (with M representing model).

Current video frame 111 is resized at resize operation 201 to an interpolated image 211, which may also be characterized as a resized current video frame, a resized frame, etc. Interpolated image 211 may be upsampled from current video frame 111 using any suitable technique or techniques such as linear or non-linear interpolation, etc. Notably, interpolated image 211 is generated such that its depth matches that of current video frame 111 (e.g., a depth of 3 for RGB) while its resolution has been increased such that interpolated image 211 is made up of a grid of sub-images 221 such as sub-image 212, 213. Notably, interpolated image 211 may be divided in its entirety and evenly into grid of sub-images 221. For example, current video frame 111 is resized to resized current video frame or interpolated image 211 such that interpolated image 211 includes of sub-images 221 each having dimensions corresponding to dimensions of object classification CNN 221. That is, the size and dimensions of sub-images 221 match the size and dimensions for an image to be processed by object classification CNN 221.

In some embodiments, the size of interpolated image 211, which may be generalized as $w_R \times h_R$ (with R representing resized) may be generated as shown with respect to Equation (2):

$$w_R \times h_R = w_M \cdot \left\lceil \frac{w_I}{w_M} \right\rceil \times h_M \left\lceil \frac{h_I}{h_M} \right\rceil \quad (2)$$

where $w_R$ is the width of interpolated image 211, $h_R$ is the height of interpolated image 211, $w_I$ is the width of current video frame 111, $h_I$ is the height of current video frame 111, $w_M$ is the width of an image to be processed by object classification CNN 202 (e.g., an input width of object classification CNN 202), $h_M$ is the height of an image to be processed by object classification CNN 202 (e.g., an input height of object classification CNN 202), and $\lceil X \rceil$ is the ceiling function, which maps its input to the least integer greater than the input. As used herein with respect to object classification CNN 202, the term width As provided in Equation (2), the resolution of interpolated image 211 (i.e., a resized current video frame) has a width (i.e., $w_R$) that is a product of an input width of object classification CNN 202 (i.e., $w_M$) and an output from a ceiling function applied to a ratio of a width of current video frame 111 (i.e., $w_I$) to the input width of object classification CNN 202 (i.e., $w_M$) and, similarly, the resolution of interpolated image 211 (i.e., a resized current video frame) has a height (i.e., $h_R$) that is a product of an input height of object classification CNN 202 (i.e., $h_M$) and an output from a ceiling function applied to a ratio of a height of current video frame 111 (i.e., $h_I$) to the input height of object classification CNN 202 (i.e., $h_M$). As used herein, the terms input width and input height indicate the width and height (i.e., resolution) of an input image to be processed by the CNN. Notably, the input also has a depth such as 3 (for an RGB image), 1 (for a grayscale image), or the like.

In the illustrated embodiment, current video frame 111 has a resolution of 1920×1080 and object classification CNN 202 has an input resolution of 224×224. As can be seen by application of Equation (2), interpolated image 211 then has a resolution of 2016×1120 such that grid of sub-images 221 includes a 9×5 grid of sub images 221. As discussed, each pixel of interpolated image 211 is part of one and only one of sub images 221 and no pixel of interpolated image 211 is not a part of one and only one of sub images 221. That is, interpolated image 211 (i.e., a resized current video frame) is provided such that interpolated image 211 consists of grid of sub-images 221.

Interpolated image 211 is then re-organized or stacked or the like, at stack operation 203, from a 3D image tensor having a size of $w_R \times h_R \times d_R$, where d represents depth (e.g., 2016×1120×3) to a 4D tensor having a size of $(w_R/w_M)(h_R/h_M) \times d_R \times w_M \times h_M$ (e.g., 45 ordered sub images each of size 224×224×3 with 4D dimensions of 45×3×224×224). For example sub-images 221 may be ordered into an array in a raster scan order or the like to provide 4D tensor 222 comprising an ordered array of 3D tiled tensors 223 corresponding to sub-images 221. For example, 4D tensor 222 including tiled tensors 223 corresponding to grid of sub-images 221 may have a size of $(w_R/w_M)(h_R/h_M)$ (e.g., 45 in the illustrated example) representing the number of tiles (i.e., sub-images 221). As shown, 3D tiled tensors 223 are stacked along a first axis of the tensor that represents the ordering of tiled tensors 223. That is, the first axis of 4D tensor 222 may run along or represent the ordered tiled tensors 223. In some embodiments, 4D tensor 222 may be characterized as P.

As shown, 4D tensor 222 is passed through object classification CNN 202 (or any suitable CNN as discussed herein) at feature extraction operation 204 to generate object classification output volume 214. Object classification output volume 214 may also be characterized as a tessellated output, a CNN output, or the like and object classification output volume 214 includes, for each pixel of each of sub-images 221 (and therefore for each of tiled tensors 223), any number of feature values each from one of the layers of object classification output volume 214. That is, the output from any number of convolutional layers of object classification output volume 214 is accessed and the entirety of the output volume or one or more frames of the output volume from the convolutional layers are concatenated to generate object classification output volume 214. For example, for a particular pixel of sub-image 212, any number of convolutional layers are accessed and some or all of the feature values for the pixel in the corresponding convolutional layer output volume are retrieved. Therefore, for each pixel of each sub-images 221, a hypercolumn of features are attained and, taken together, the hypercolumns provide object classification output volume 214. In some embodiments, not all convolutional layers may be used and not all features from the selected layers may be used. As used herein, the term CNN indicates a pretrained deep learning neural network including any number of convolutional layers each including at least a convolutional operation (and optionally including, for example, a leaky RELU layer, a pooling or summing layer, and/or a normalization layer). The term convolutional layer indicates a layer that provides a convolution operation on an input volume of the layer by applying any number of convolutional kernels to generate an output volume. Such convolutional layers may also include other operations.

As discussed, 4D tensor 222 (f) is passed through object classification CNN 202 (model, M). In some embodiments, 4D tensor 222 is passed through object classification CNN 202 as a mini-batch along the discussed first axis (e.g., having a size of 45) such that the model (e.g., object classification CNN 202) may be called in parallel such that the model operates on one or more of 3D tiled tensors 223 in parallel for improved speed and processing efficiency. In some embodiments, applying object classification CNN 202 to sub-images 221 includes applying sub-images 221 two or more of sub-images 221 (e.g., first and second sub-images) in parallel such that said feature value generation and retrieval are performed in parallel for two or more of sub-images 221. Furthermore, application of object classification CNN 202 (model, M) provides, for 4D tensor 222, an output 4D tensor having the same dimension along the first axis (e.g., 45 or more generally $(w_R/w_M)(h_R/h_M)$), each having a same resolution (e.g., 224×224 or more generally $w_M \times h_M$), and each having a depth of the number of retrieved features (e.g., 1500 or more generally d F where F indicates the number of features). The output 4D tensors (not shown) may then be merged or unfolded or the like to generate 3D object classification output volume 214. Such merging may be provided by merging each 4D tensor in accordance with grid of sub-images 221. For example, if a raster scan was used to generate 4D tensor 222 an inverse of the raster scan may be used to assemble grid of sub-images 221. Notably, grid of sub-images 221 has the same resolution as interpolated image 211 and a depth equal to the number of extracted features (e.g., $w_R \times h_R \times d_F$).

Object classification output volume 214 is then resized at resize operation 205 to the resolution of current video frame 111 to generate features volume 130. Resize operation 205 may be performed using any suitable technique or techniques such as downsampling techniques or the like. As shown, object classification output volume 214 is resized to generate features volume 130 having dimensions of $w_I \times h_I \times d_F$ such that the resolution is the same as that of current video frame 111 ($w_I \times h_I$) and the depth is the same as that of object classification output volume 214 ($d_F$).

With reference to FIG. 1, features volume 130 is provided to feature compression module 103, which compresses features volume 130 to feature frames 119 as discussed further herein. For example, the feature depth of features volume 130 (e.g., about 1500 features) may be compressed by a compression rate of about 50% to generate feature frames 119 having about 750 features. Such feature reduction may improve the computational performance of segmentation network 101 without loss of segmentation accuracy.

Discussion now turns to retrieval or extraction of features by feature extraction module 102. In some embodiments, such extraction or retrieval may be performed based on implementation of tessellation operations as discussed with respect to FIG. 2. For example, the extraction may be performed with respect to object classification CNN 202 as implemented on 4D tensor 222 (e.g., on ordered sub-images 221). In other embodiments, the extraction or retrieval is performed based on an object classification CNN operating on an input image without tessellation. In such embodiments, the input image may be downsampled prior to implementation of the object classification CNN. Notably, segmentation network 121 may operation on feature frames 119 generated with or without tessellation techniques.

Figure 3:
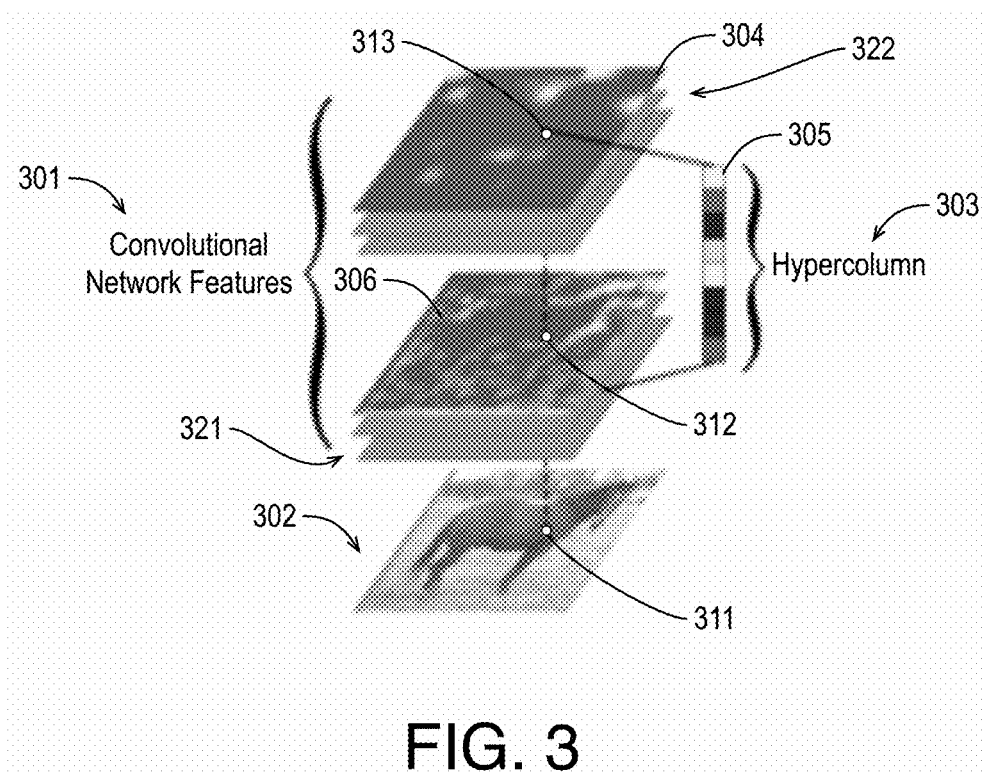
FIG. 3 illustrates an example volume of convolutional network features for an example input image extracted from convolutional layers of an object classification convolutional neural network as applied to the input image.

FIG. 3 illustrates an example volume of convolutional network features 301 for an example input image 302 extracted from convolutional layers of an object classification convolutional neural network as applied to input image 302, arranged in accordance with at least some implementations of the present disclosure. In FIG. 3, each feature map of volume of convolutional network features 301 such as feature maps 304, 306 are extracted from an object classification CNN (e.g., object classification CNN 202) after application of the object detection CNN to input image 302. Input image 302 may be an image corresponding to any one of sub-images 221 (when tessellation is implemented) or an image corresponding to a downsampled version of current video frame 111 (when tessellation is not implemented). For example, when tessellation is implemented, volume of convolutional network features 301 corresponds to an output feature volume for one of sub-images 221. When tessellation is not implemented, volume of convolutional network features 301 corresponds to features volume 130.

As shown with respect to pixel 311 of input image 302, each feature map of volume of convolutional network features 301 such as feature maps 304, 306 has a corresponding feature or feature value such as feature value 313 of feature map 304 and feature value 312 of feature map 306 and so on such that, for pixel 311, a hypercolumn 303 of feature values 305 is provided. The hypercolumns taken together and including hypercolumn 303 provide a volume of convolutional network features 301. As discussed, each of feature maps 304, 306 correspond to an output volume of a convolutional layer of the applied object classification CNN. For example, batch 321 of feature maps including feature map 306 may be from a particular output volume of a particular convolutional layer, batch 322 of feature maps including feature map 304 may be from another output volume of another convolutional layer, and so on. As discussed, in some embodiments, each available feature map of the object classification CNN is used. However, not all need to be employed.

Furthermore, in the context of tessellation operations, a number of volumes of convolutional network features including volume of convolutional network features 301 are merged to generate object classification output volume 214. With reference to FIG. 2, in the illustrated example, 45 (($w_R/w_M$)($h_R/h_M$)) volumes of convolutional network features are merged to generate object classification output volume 214 such that each volume of convolutional network features has a resolution of 224×224 ($w_M \times h_M$) and a depth of 1500 ($d_M$). As discussed, such techniques may provide denser features for more accurate segmentation.

Figure 4:
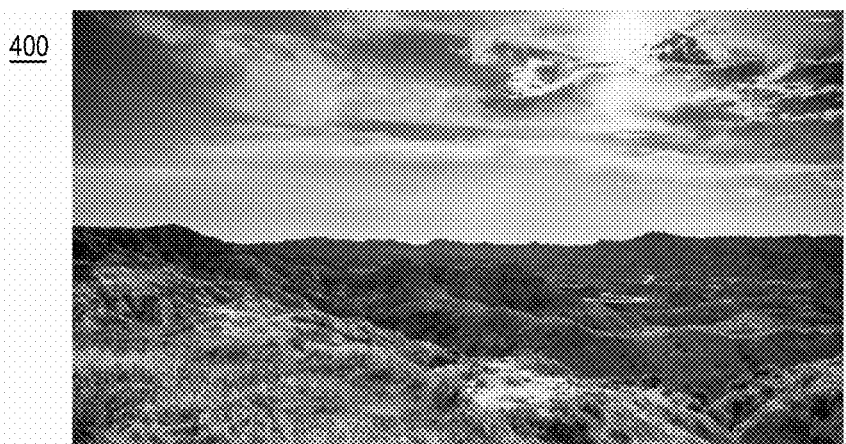
FIG. 4 illustrates an exemplary image.

FIG. 4 illustrates an exemplary image 400, arranged in accordance with at least some implementations of the present disclosure. For example, exemplary image 400 may be current video frame 111. As shown in FIG. 4, exemplary image 400 includes a landscape scene. Notably, exemplary image 400 does not include a foreground object but exemplary image 400 is used to illustrate the density of features attained using tessellation in contrast to non-tessellation techniques.

Figure 5:
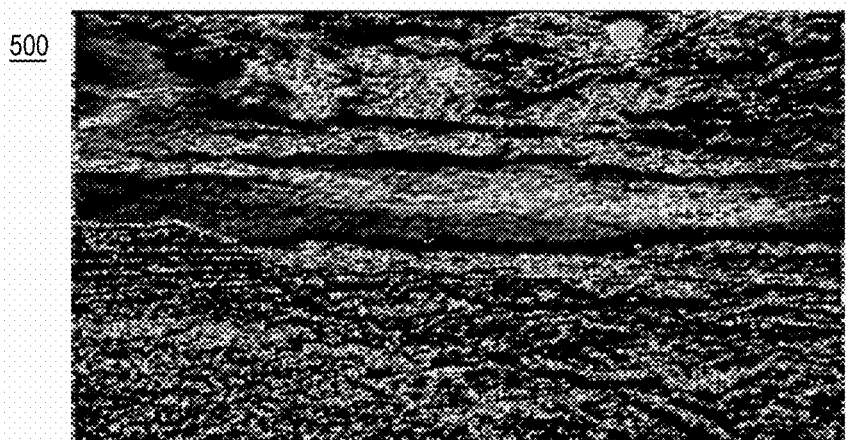
FIG. 5 illustrates an exemplary feature map attained from the exemplary image without tessellation.

FIG. 5 illustrates an exemplary feature map 500 attained from exemplary image 400 without tessellation, arranged in accordance with at least some implementations of the present disclosure. For example, feature map 500 corresponds to exemplary image 400 and illustrates feature values from a particular feature map (e.g., feature map 306) attained by application of an object classification CNN to exemplary image 400. As shown in FIG. 5, exemplary feature map 500 includes features at a particular density and fidelity. a landscape scene. Notably, exemplary feature map 500 provides relatively sparse feature density.

Figure 6:
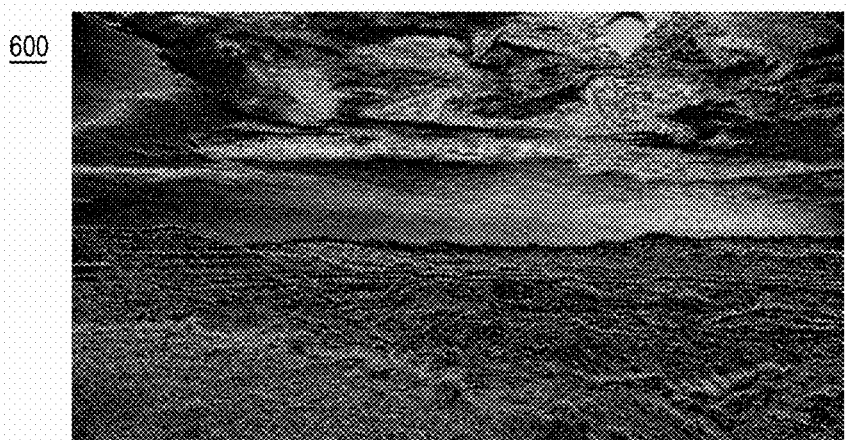
FIG. 6 illustrates an exemplary feature map attained from the exemplary image with tessellation.

FIG. 6 illustrates an exemplary feature map 600 attained from exemplary image 400 with tessellation, arranged in accordance with at least some implementations of the present disclosure. As with feature map 500, feature map 600 corresponds to exemplary image 400, however, feature map 500 is attained using tessellation techniques. For example, feature map 600 illustrates feature values from a particular feature map generated by applying an object classification CNN to sub-images from an upsized image (e.g., upsized from exemplary image 400 to a size that fits a grid of sub-images having an input resolution corresponding to the input resolution of the object classification CNN), merging resultant feature maps (e.g., a number of feature maps such as feature map 306) attained by application of an object classification CNN to each sub-image, and downsampling the resultant feature map to the resolution of exemplary image 400). As shown in FIG. 6, exemplary feature map 600 includes features at a much higher density and fidelity with respect to feature map 500. Such improved feature density and fidelity provides improved segmentation. For example, a feature volume including feature map 600 (and many others) may be compressed and provided to a segmentation network as discussed further herein.

With reference to FIG. 1, discussion now turns to compression of features volume 130 (attained with or without tessellation) to generate feature frames 119. Notably, feature frames 119 also represents a feature volume and feature frames 119 may be characterized as a compressed feature volume or the like. The compression of features volume 130 to generate feature frames 119 (e.g., a features volume having a reduced depth) may be performed using any suitable technique or techniques. Notably, feature frames 119 may also be characterized as having per pixel hypercolumn deep features, although they are compressed features from layers of an object classification CNN. In some embodiments, feature frames 119 are generated via compression using Tucker decomposition of features volume 130. For example, per pixel hypercolumn deep features (feature frames 119) may be generated from compressed (via Tucker decomposition) object detection CNN 101 (e.g., VGG-19) features.

Figure 7:
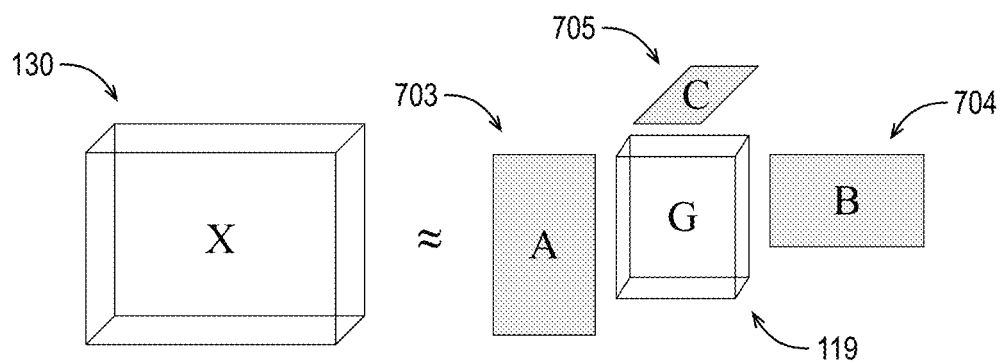
FIG. 7 illustrates an example compression of a features volume to generate feature frames for a segmentation network input.

FIG. 7 illustrates an example compression of features volume 130 to generate feature frames 119 for segmentation network input 101, arranged in accordance with at least some implementations of the present disclosure. As shown in FIG. 7, features volume 130 (X) (e.g., as extracted by feature extraction module 102) may be approximated by feature frames 119 (G) and principal components 703, 704, 705 (A, B, C). Notably, principal components 703, 704, 705 are discarded while feature frames 119 are provided as part of segmentation network input 121.

For example, Tucker decomposition is an example of higher order singular value decomposition (HOSVD) that may be applied to compress features volume 130 to feature frames 119. Notably, Tucker decomposition is applied with pre-training with respect to segmentation network 101 to perform dimensionality reduction while preserving the needed details for use by features volume 130. Such pre-training of feature compression via Tucker decomposition may be performed using any suitable technique or techniques. In an embodiment, principal components 703, 704, 705 are selected during a training phase for application in an inference phase, although any suitable parameters of the Tucker decomposition may be modified during the pre-training.

For example, for a 3-tensor (e.g., a 3D tensor as provided here), Tucker decomposition may be framed as a problem of finding a decomposition of tensor X (e.g., features volume 130) such that $X \in \mathbb{R}^{I \times J \times K}$ (e.g., X has real numbers with a volume dimension of I×J×K) with a core tensor G (feature frames 119) such that $G \in \mathbb{R}^{P \times Q \times R}$ (e.g., G has real numbers with a volume dimension of P×Q×R), and principal components A (e.g., principal component 303) such that $A \in \mathbb{R}^{I \times P}$ (e.g., A has real numbers with an area dimension of I×P), B (e.g., principal component 304) such that $B \in \mathbb{R}^{J \times Q}$ (e.g., B has real numbers with an area dimension of J×Q), and C (e.g., principal component 305) such that $C \in \mathbb{R}^{K \times R}$ (e.g., C has real numbers with an area dimension of K×R) using Equation (3) as follows. Notably, in this context, K is about 1500 (the number or extracted feature maps), R is about 750 (e.g., using 50% compression), and I=P and J=Q where I×J is the resolution of input video frame 111 (and other frames of segmentation network input 121). In some embodiments, the Tucker decomposition may be determined as shown with respect to Equation (3):

$$\min_{\hat{x}} \|X - \hat{X}\| \text{ with } \hat{X} = \sum_{p=1}^{P}\sum_{q=1}^{Q}\sum_{r=1}^{R} g_{pqr} a_r e b_r e c_r = G \times_1 A \times_2 B \times_3 C \quad (3)$$

where e denotes an outer product, G is the core tensor (feature frames 119), and A, B, C, are factor matrices or principal components in the respective tensor mode, and where the metricized version of may be expressed as shown in Equations (4):

$$\hat{X}_{(1)} = AG_{(1)}(C \otimes B)^T$$

$$\hat{X}_{(2)} = BG_{(1)}(C \otimes A)^T$$

$$\hat{X}_{(3)} = CG_{(1)}(B \otimes A)^T \quad (4)$$

where $\otimes$ indicates a Kronecker product.

Generally, compression is achieved when P<I, Q<J, and/or R<K (e.g., with the core tensor, G, being the compressed version of the original tensor, X). As discussed, in the context of compressing features volume 130 to feature frames 119, compression is only provided in one dimension (e.g., the depth or number of feature maps).

Returning to FIG. 1, as shown, segmentation network input 121 is provided to segmentation network 101, which generates one or more segmentations 151 corresponding to current video frame 111. As discussed, includes a concatenation of context feature volume 130 and feature frames 119. As shown, in some embodiments, segmentation network 101 generates multiple segmentations 151 including segmentation 152 and segmentation 153. In such embodiments, a pretrained selection network may be implemented to generate a final segmentation result. In some embodiments, multiple segmentations 141 are ordered based on likelihood of accuracy by segmentation network 101. In other embodiments, segmentation network 101 provides a single segmentation 142. Segmentation network 101 may include any suitable CNN and as used herein the term segmentation network indicates a CNN that generates one or more segmentation frames 151 based on a segmentation network input such that each of the multiple candidate segmentations indicates a probability that each pixel thereof is in an object of interest.

In some embodiments, segmentation network 101 employs a segmentation network having context aware skip connections. Such context aware skip connections concatenate an output volume from an immediately previous convolutional layer of the segmentation network with a context feature volume (e.g., context feature volume 130) provided as part of an input to the segmentation network. The concatenated volume including the previous convolutional layer output volume and the context feature volume is provided as an input to the immediate next convolutional layer, and so on. Such techniques provide the context feature volume to all or some of the convolutional layers of the segmentation network. Notably, the context feature volume is also provided, along with feature frames 119, to the first layer of the segmentation network. Furthermore, it is noted that such context aware skip connections do not provide output from one convolutional layer to any other convolutional layer except for an immediately subsequent convolutional layer. Therefore, such context aware skip connections do not provide skip connections for the convolutional layer output but instead provide a skip connection for the context feature volume to each (or one or more) convolutional layer subsequent to the first layer of the segmentation network. Such context aware skip connections may also may characterized as context aware deep connections or simply context aware connections.

Such context aware connections allow features from the context feature volume to bypass layers and remain undiluted to deep convolutional layers (e.g., layers other than the first layer). Thereby, the segmentation network is provided access to a larger variety of feature representations (e.g., from the context feature volume) deeper within the network as opposed to a strict hierarchical sequential representation of features.

Figure 8:
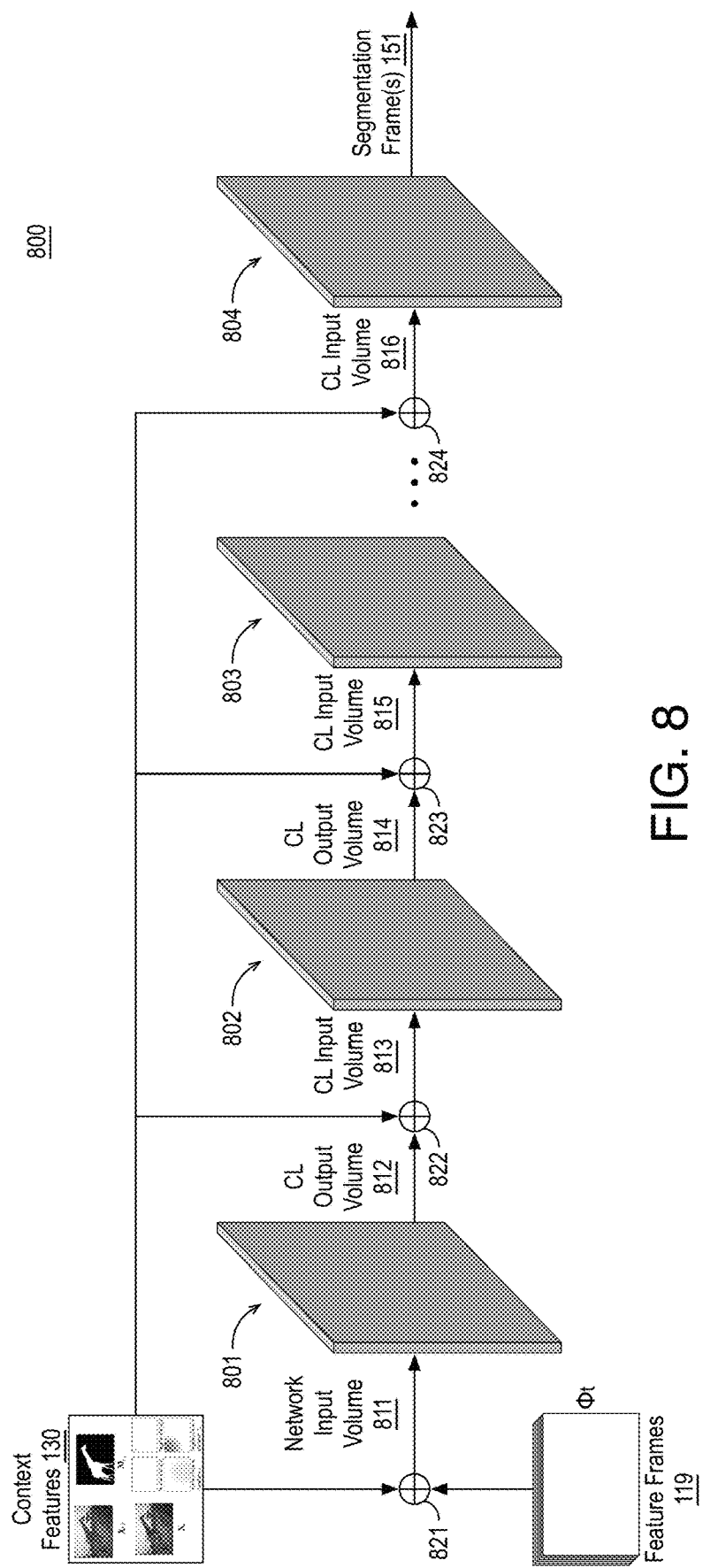
FIG. 8 illustrates an example segmentation network having context aware skip connections.

FIG. 8 illustrates an example segmentation network 800 having context aware skip connections, arranged in accordance with at least some implementations of the present disclosure. For example, segmentation network 800 may be implemented as segmentation network 101. As shown, segmentation network 800 may include any number of convolutional layers (CLs) 801, 802, 803, 804 including a first convolutional layer 801 that receives a segmentation network input volume 811. For example, segmentation network input volume 811 may be segmentation network input 121 including a concatenation, as performed by concatenation operation 821, of context feature volume 130 and feature frames 119.

Segmentation network input volume 811 is provided to first convolutional layer 801, which processes the segmentation network input volume 811 by applying any number of convolutional filters (as defined by the segmentation network architecture) using pretrained filter weights (as defined by the segmentation network pretraining) to segmentation network input volume 811 to generate a convolutional layer output volume 812, which may have, for example, the same resolution as segmentation network input volume 811 and a depth defined by the number of convolutional filters or kernels applied by first convolutional layer 801. For example, convolutional layer output volume 812 may include a number of feature maps equal to the number of convolutional filters or kernels applied by first convolutional layer 801 and the same resolution as segmentation network input volume 811.

Convolutional layer output volume 812 is then concatenated with context feature volume 130 at concatenation operation 822 to generate a convolutional layer input volume 813 including a combination of context feature volume 130 and convolutional layer output volume 812. Convolutional layer input volume 813 is provided to second convolutional layer 802, which processes the convolutional layer input volume 813 by applying any number of convolutional filters using pretrained filter weights to convolutional layer input volume 813 to generate a convolutional layer output volume 814.

Convolutional layer output volume 814 may have the same resolution as segmentation network input volume 811 and a depth defined by the number of convolutional filters or kernels applied by second convolutional layer 802. As shown, second convolutional layer 802 is immediately subsequent to first convolutional layer 801 such that there are no intervening convolutional layers therebetween.

Similarly, convolutional layer output volume 814 is then concatenated with context feature volume 130 at concatenation operation 823 to generate a convolutional layer input volume 815 including a combination of context feature volume 130 and convolutional layer output volume 814. Convolutional layer input volume 815 is provided convolutional layer 803, which processes the convolutional layer input volume 815 as discussed with respect to convolutional layers 801, 802 to generate a convolutional layer output volume (not shown). Such processing is continued for any number of convolutional layers through convolutional layer 804, which receives a convolutional layer input volume 816 that is a concatenation, as provided by concatenation operation 824, of context feature volume 130 and a convolutional layer output volume from convolutional layer 803 or another convolutional layer of segmentation network 800.

As shown, convolutional layer 804 (i.e., the final convolutional layer of segmentation network 800) processes convolutional layer input volume 816 to generate one or more segmentation frames 151 (including one or more segmentation frames 152, 153) for current video frame 111. Although discussed with respect to each convolutional layer having a context aware skip connection, in some embodiments one or more of the convolutional layers does not receive context feature volume 130.

For example, context feature volume 130 may include current video frame 111, previous video frame 112, object of interest indicator frame 115, background indicator frame 117, positive distance transform frame 116, negative distance transform frame 118, and previous segmentation frame 114. As shown, in some embodiments, these features (as provided by context feature volume 130) are concatenated with the previous convolutional layer output and passed to the current convolutional layer of segmentation network 800. Such context based features are advantageously provided to deep convolutional layers because context features provide high-fidelity, information-rich features for the semantic segmentation task and are consequently highly discriminative. Furthermore, by propagating context features as skip connections, the segmentation network advantageously has access to features that have high correlation with the segmentation task being performed. Thereby, the segmentation network does not reserve overhead to redundantly encode task-relevant features in subsequent layers of the network.

Segmentation network 800 may include any CNN architecture having any number of convolutional layers each having convolutional kernels of any size, number, and dilation. Furthermore, some of the convolutional layers may be followed by rectified linear units and, after a final convolutional layer thereof segmentation network 800 may include an activation layer or activation function layer to provide pixel wise probabilities that each pixel is in the object of interest. The output of segmentation network 800 may include one or more segmentations 151 that each include pixel wise probabilities as to whether the pixel is included in the object of interest as discussed above. The probabilities may be over a particular range (e.g., 0 to 1, inclusive) or they may be binary.

In an embodiment, segmentation network 800 has a CNN architecture as outlined by Table 1 below such that segmentation network 101 has 9 layers followed by an activation function layer as discussed above. As shown, a first convolutional layer may apply 75 1×1 convolution kernels at dilation 1, second through eighth convolutional layers may apply 75 3×3 convolution kernels at increasing dilations of 1, 4, 8, 16, 32, 64, and 128, and a ninth convolutional layer may apply 75 1×1 convolution kernels at dilation 1.

TABLE 1

| Example Segmentation Network Architecture | | | | | | | | | |
|---|---|---|---|---|---|---|---|---|---|
| Layer | 1 | 2 | 3 | 4 | 5 | 6 | 7 | 8 | 9 |
| Convolution | 1 × 1 | 3 × 3 | 3 × 3 | 3 × 3 | 3 × 3 | 3 × 3 | 3 × 3 | 3 × 3 | 3 × 3 |
| Dilation | 1 | 1 | 4 | 8 | 16 | 32 | 64 | 128 | 1 |
| Depth | 80 | 80 | 80 | 80 | 80 | 80 | 80 | 80 | 80 |

Segmentation network 800 implements network parameters that were pretrained as discussed herein below.

Figure 9:
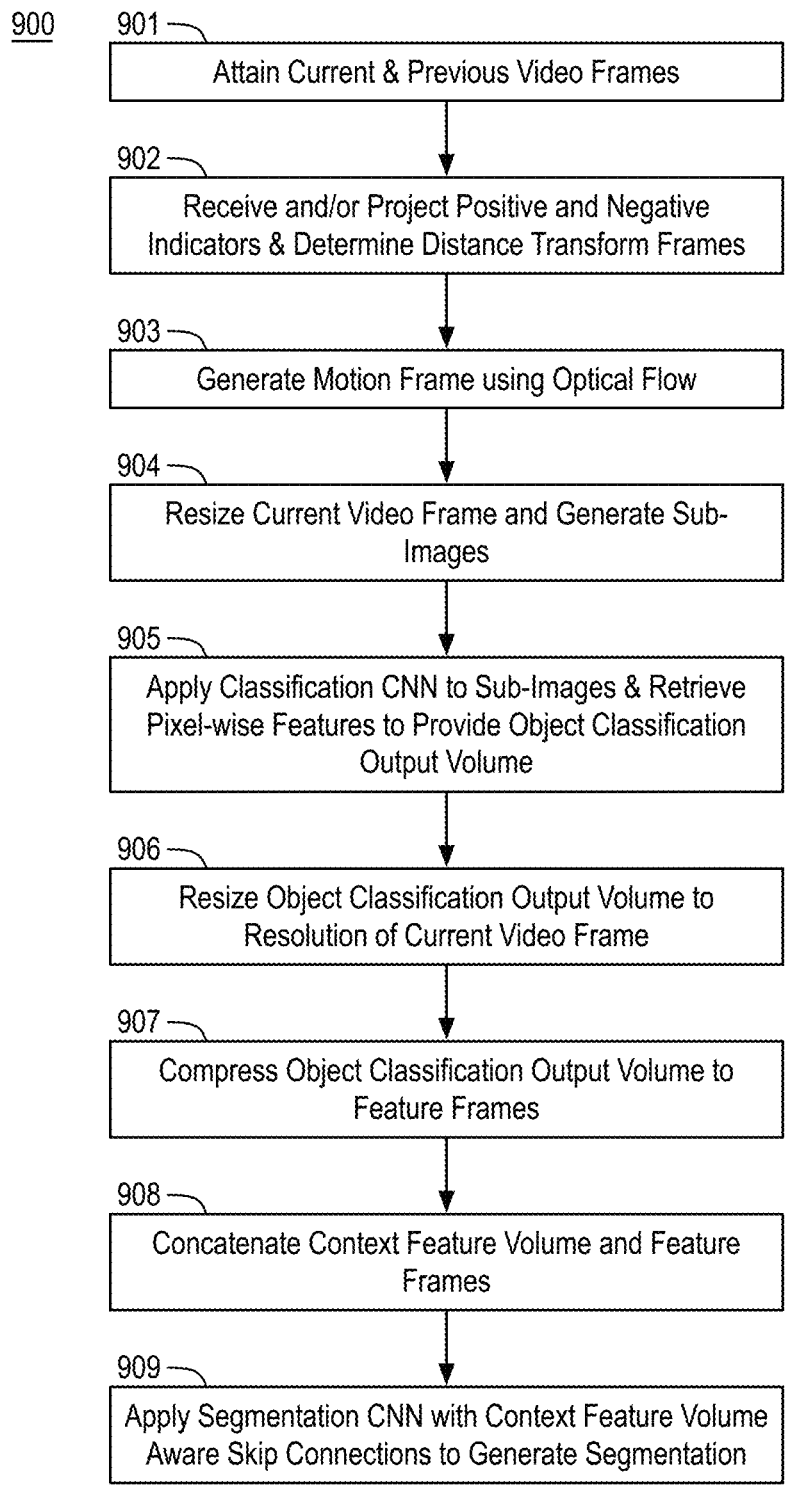
FIG. 9 is a flow diagram illustrating an example process for generating a segmentation from input video and user object and background selections.

FIG. 9 is a flow diagram illustrating an example process 900 for generating a segmentation from input video and user object and background selections, arranged in accordance with at least some implementations of the present disclosure. Process 900 may include one or more operations 901-909 as illustrated in FIG. 9. Process 900 may be performed by any device or system discussed herein to generate a segmentation or segmentation mask. Process 900 or portions thereof may be repeated for any number of current video frames, video sequences, etc. The resultant segmentation mask may be further used in any visual effects application such as rotoscoping operations.

Process 900 begins at operation 901, where a current video frame and a temporally previous video frame (in capture and presentation order) are attained. The current video frame and the temporally previous video frame may each include a single luma channel frame or multiple (e.g., three) planes or frames such as a luma frame and two chroma frames (e.g., YUV, YCbCr) or three chroma frames (e.g., RGB).

Processing continues at operation 902, where positive and negative indicators representative of locations within an object of interest are received or projected and distance transform frames, one each corresponding to the positive locations frame and the negative locations frame, are generated. For example, for a first video frame of a video sequence, the positive and negative indicators may be provided by a user while, for subsequent video frames of the video sequence, the positive and negative indicators may be projected using optical flow techniques. Furthermore, at operation 902, an object of interest frame or positive locations frame and a background frame or negative locations frame corresponding to the positive and negative indicators, respectively, may be generated such that the positive locations frame indicates (via a value such as one) locations of the positive indicators and the negative locations frame indicates (via a value such as one) locations of the negative indicators with other values of the frame values corresponding to not indication (e.g., using a value of zero). Furthermore, positive and negative distance transform frames may be generated as discussed with respect to Equations (1) such that the positive distance transform frame includes, for each pixel thereof, a value indicative of a minimum distance to any of the locations of the positive indicators and the negative distance transform frame includes, for each pixel thereof, value indicative of a minimum distance to any of the locations of the negative indicators.

Processing continues at operation 903, where a motion frame is generated using any suitable motion tracking techniques such as dense optical flow techniques. In other embodiments, motion estimation techniques such as block matching techniques may be used. As discussed, the motion frame includes motion indicators indicative of motion from the previous video frame to the current video frame such as per pixel velocity motion vectors (e.g., a motion vector for each pixel of the motion frame).

Processing continues at operation 904, where the current video frame received at operation 901 is resized (e.g., upsampled) and sub-images are generated such that each of the sub-images has a size corresponding to an input size of a pretrained object classification CNN. In some embodiments, the size or resolution of the resized video frame or image is generated as discussed with respect to Equation (2) such that a discrete whole number of sub-images are provided within the resized video frame or image. That is, given the input size of the pretrained object classification CNN a size of the resized video frame or image is determined such that the size is larger than the input current video frame by an amount that will fit whole sub-images in both the horizontal (along a width) and vertical (along a height) dimension. Although discussed herein with respect to exemplary upsizing of the input current video frame, in some embodiments, the input current video frame may be downsized to fit whole sub-images. For example, in Equation (2) the ceiling function may be replaced by a floor function. The resized video frame or image may be generated using any suitable technique or techniques such as interpolation techniques.

Processing continues at operation 905, where an object classification CNN or other object CNN is applied to each of the sub-images generated at operation 904 and pixel wise hypercolumns are retrieved. The object classification CNN may be any suitable CNN such as the VGG-19 pretrained CNN. Furthermore, the pixel wise hypercolumns may include feature values from any layers (e.g., hidden layers) of the pretrained CNN. Each hypercolumn includes a number of features for each pixel (e.g., about 1500 features or values) that span across feature maps such that each pixel has a feature value in each feature map as illustrated with respect to FIG. 3. The retrieved hypercolumns and feature maps may be viewed as a volume with two dimensions corresponding to the dimensions of each feature map and a third dimension (e.g., depth) corresponding to the dimension of each hypercolumn (and the number feature maps).

The pixel-wise hypercolumns are then merged across each sub-image to generate a feature volume and then again across the input resized image by merging each sub-image volume to determine the object classification output volume. Notably, the object classification output volume includes, for each pixel thereof, a hypercolumn of features that spans across feature maps. Furthermore, the object classification output volume has a depth equal to the number of features retrieved and a resolution equal to the resized video frame or image generated at operation 904.

Processing continues at operation 906, where the object classification output volume generated at operation 905 is resized to the resolution of the current video frame attained at operation 901. The object classification output volume may be resized using any suitable technique or techniques such as downsampling techniques. Although illustrated with respect to resizing at operation 906 and compression at operation 907 (as discussed immediately below), in some embodiments, compression may be performed first (at the resolution of the resized video frame or image) and subsequently resizing (to the resolution of the current video frame) may be performed.

Processing continues at operation 907, where the resized object classification output volume determined at operation 906 is compressed to generate feature frames of compressed features. As discussed, such compression reduces the dimensionality of the depth of the volume (e.g., the number of feature maps) while maintaining the dimensionality (e.g., size or resolution) corresponding to the dimensions of each feature map. The compression may be performed using any suitable technique or techniques such as Tucker decomposition. In an embodiment, compressing the resized object classification output volume includes applying Tucker decomposition to determine a core tensor that is the compressed feature frames.

Processing continues at operation 908, where the a context feature volume and the compressed feature frames generated at operation 907 are concatenated. As discussed herein, the context feature volume includes any combination of the current video frame, a previous video frame, a motion frame, a previous segmentation frame, an object of interest indicator frame, a background indicator frame, a positive distance transform frame, and a negative distance transform frame. Any combination of such frames are combined to provide the context feature volume, which is concatenated with the compressed feature frames. Notably, the context feature volume is also provided to deep layers of a segmentation network as discussed with respect to operation 909.

Although discussed herein with respect to the same context feature volume being provided as part of the segmentation network input volume and the convolutional layer input volume to some of the convolutional layers of the segmentation network, in some embodiments, the context feature volumes may be different. In an embodiment, a context feature volume is provided at the input of the segmentation network while a reduced context feature volume is provided to one or more or all of the layers of the segmentation network subsequent to the input layer. In an embodiment, the context feature volume includes a combination of the current video frame, a previous video frame, a motion frame, a previous segmentation frame, an object of interest indicator frame, a background indicator frame, a positive distance transform frame, and a negative distance transform frame while the reduced context feature volume eliminates one or more of such frames. In an embodiment, the reduced context feature volume eliminates the motion frame. In an embodiment, the reduced context feature volume eliminates the positive and negative distance transform frames. In an embodiment, the reduced context feature volume eliminates the motion frame and the positive and negative distance transform frames. Such techniques may advantageously reduce computational complexity while maintain some advantage of passing context features to the deep layers of the segmentation network.

Processing continues at operation 909, where a segmentation network is applied to a segmentation input volume generated at operation 908 such that the segmentation network employs context feature volume aware skip connections as discussed herein to generate one or more segmentations. For example, each convolutional layer of the segmentation network subsequent to the first convolutional layer may receive the context feature volume and the output from the immediately preceding convolutional layer. The segmentation network is pre-trained as discussed further with respect to FIG. 10. In some embodiments, the segmentation network is pretrained using a loss function including a boundary loss term including a difference between ground truth values for ground truth boundary points corresponding to a training object of interest and resultant values for the boundary points corresponding to application of the segmentation convolutional neural network during training.

In some embodiments, a non-binary segmentation having values ranging from 0 to 1 at any accuracy as attained at operation 909 may be thresholded using any suitable threshold such as 0.5 to generate a binary segmentation mask with first indicators or values (e.g., values of one) indicating pixels deemed to be within the object of interest. For example, values of the final segmentation below 0.5 may be deemed to be background and assigned a second indicator or value (e.g., a value of zero) while values of the final segmentation greater than or equal to 0.5 may be deemed to be part of the object of interest and assigned the first indicator or value. The non-binary segmentation and/or the binary segmentation mask may be used in any suitable context such as visual effects, rotoscoping, etc. Notably, the binary segmentation mask may be used to attain pixels (e.g., by overlaying with respect to the current video frame) of the object of interest to extract the object of interest. The extracted the object of interest may then be placed on a different background, manipulated, etc.

Figure 10:
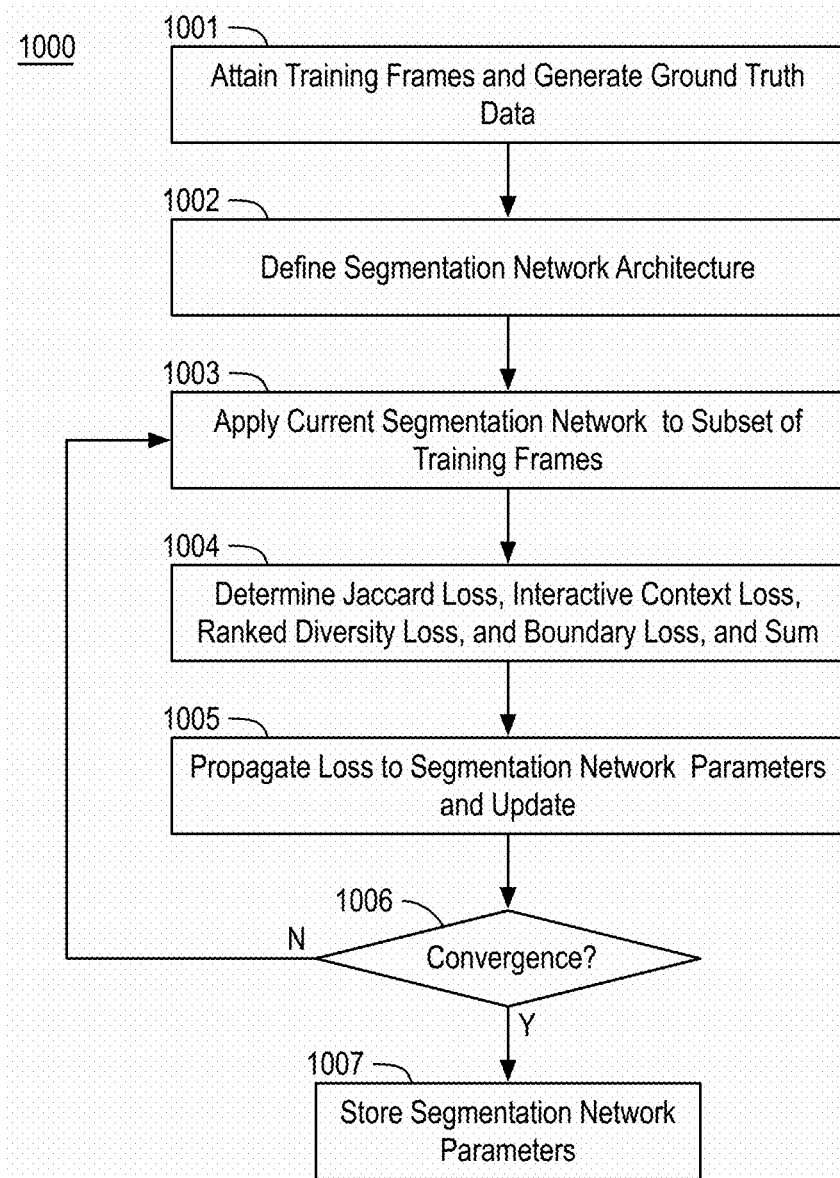
FIG. 10 is a flow diagram illustrating an example process for training a segmentation network.

FIG. 10 is a flow diagram illustrating an example process 1000 for training a segmentation network, arranged in accordance with at least some implementations of the present disclosure. Process 1000 may include one or more operations 1001-1007 as illustrated in FIG. 10. Process 1000 may be performed by any device or system discussed herein to train any segmentation network discussed herein. Process 1000 or portions thereof may be repeated for any training, training sets, etc. The parameter weights generated by process 1000 may be stored to memory and implemented via a processor, for example, to generate segmentations and segmentation masks for video frames as discussed herein.

Process 1000 begins at operation 1001, where training frames are attained and ground truth data for the training frames is generated. The training frames may include any number of training sets of video sequences having the characteristics discussed herein. For example, it is desirable that the training frames have the same or similar characteristics with respect to the expected frames that will be attained during inference. In some embodiments, the ground truth data includes an indication, for each pixel of each of the training frames as to whether the pixel is part of an object of interest or part of a background. Such ground truth data may be binary for example with a value of one for pixels that are part of the object of interest and a value of zero for other pixels (e.g., background pixels).

Processing continues at operation 1002, where an architecture of the segmentation network is defined. The segmentation network architecture may include any characteristics such as those discussed herein with respect to segmentation network 101.

Processing continues at operation 1003, where the current segmentation network is applied to at least some of the training frames. For example, the training of the segmentation network may be an iterative process such that, at each training epoch, parameters of the segmentation network including convolutional kernel filter weights, activation function weights, and so on are updated based on a loss function discussed at operation 1004. The current segmentation network is then updated and so on until convergence. At the first iteration of operation 1003, the segmentation network may be initiated with parameters and weights using any suitable technique or techniques such as random application of weights within certain boundaries, setting weights as average weights, etc.

Processing continues at operation 1004, where, based on the results from application of the current segmentation network at operation 1003, a loss is determined based on a loss function. As shown in FIG. 10, in some embodiments, the loss applied loss function sums a Jaccard loss, an interactive content loss, ranked diversity loss, and a boundary loss as discussed further below. In other embodiments, one or more of the losses just described may be discarded and/or additional losses may be used. Notably, the loss function applied at operation 1004 includes a boundary loss to strongly encourage boundary points in the candidate segmentations generated by the segmentation network to match the ground truth boundary points.

As discussed, in some embodiments, the loss function includes a sum of a Jaccard loss, an interactive content loss, ranked diversity loss, and a boundary loss. In some embodiments, the loss function is applied based on Equation (5) as follows:

$$L_f(\theta_f) = \sum_i \min_m \{l(Y_i, f_m(X_i; \theta_f))\} + l_{IC}(S_p^i, S_n^i, f_m(X_i; \theta_f)) + \sum_i \sum_{m=1}^M \lambda_m l(Y_i, f_m(X_i; \theta_f)) + \sum_i \sum_{m=1}^M l_{\partial-PHL}(Y_i, f_m(X_i; \theta_f))$$ (5)

where the first term after the equal sign is the Jaccard loss, the second term is the interactive content loss, the third term is the ranked diversity loss, and the fourth term is the boundary loss. The loss function illustrated with respect to Equation (5) may be characterized as a total loss function.

As discussed, the term $l(Y_i, f_m(X_i;\theta_f))$ indicates Jaccard loss (or relaxed Jaccard loss), where l indicates the loss $Y_i$ indicates a ground truth frame, $f_m$ indicates m candidate segmentations f, $X_i$ is the current input frame, and $\theta_f$ represents the current parameters of the segmentation network. In some embodiments, the relaxed Jaccard loss is defined as follow in Equation (6):

$$l(Y, f(X_i; \theta_f)) = 1 - \frac{\sum_p \min(Y(p), f(p))}{\sum_p \max(Y(p), f(p))}$$ (6)

where Y(p) represents the value of the ground truth segmentation at pixel location (or point) p in the ground truth frame, and f(p) represents the segmentation network output at pixel location (or point) p. For example, relaxed Jaccard is similar to an intersection over union metric that provides less loss when the segmented regions of interest have better overlap.

The term $l_{IC}(S_p^i, S_n^i, f_m(X_i; \theta_f))$ indicates interactive content loss that is defined as a constraint with respect to input indicators (e.g., input click locations) and the corresponding distance transform frames as discussed herein. In some embodiments, the interactive content loss is defined as follows in Equation (7):

$$l_{IC}(S_p^i, S_n^i, f_m(X_i;\theta_f)) = \|S_p * (S_p - f(X_i;\theta_f))\|_1 + \|S_n * (S_n - (1 - f(X_i;\theta_f)))\|_1$$ (7)

where * indicates the Hadamard (e.g., entry-wise product). Notably, the interactive content loss penalizes inaccurate results with respect to the discussed user input locations.

The term $\lambda_m l(Y_i, f_m(X_i;\theta_f))$ indicates ranked diversity loss and serves to encourage the segmentation network to produce visually diverse segmentations and to apply an intrinsic ranking to the segmentations. Such a condition is favorable due to the multi-modality intrinsic to semantic segmentation problems. Furthermore, the condition may be directly imposed on the segmentation network by choosing a scalar set $\{\lambda_m\}$ to foster an arbitrary ranking that must be resolved by the segmentation network itself.

Finally, the term $l_{\partial-PHL}(Y_i, f_m(X_i;\theta_f))$ indicates a boundary loss function such that losses at boundary pixels are penalized and the segmentation network is encouraged to have boundary points match the ground truth. For example, for boundary pixels (as defined by the ground truth data), a loss as determined based on the difference between the ground truth value for the boundary pixel (e.g., a value of one) and the segmentation value for the boundary pixel (e.g., a probability ranging from zero to one, inclusive). As used herein, the term boundary pixel indicates a pixel within an object of interest such that at least adjacent pixel to the boundary pixel is outside the object of interest (and, often, at least one other adjacent pixel is within the object of interest). For example, a segmentation network is pretrained using a loss function including a boundary loss term that includes a difference between ground truth values for ground truth boundary points corresponding to a training object of interest and resultant values for the boundary points corresponding to application of the segmentation convolutional neural network during training. In some embodiments, the boundary loss term includes a pseudo Huber loss term including a square of a fraction of the difference over a steepness parameter, the steepness parameter to penalize boundary segmentation errors in the segmentation convolutional neural network. In some embodiments, the boundary loss term includes a pseudo Huber loss as defined by Equation (8):

$$l_{\partial-PHL}(Y, f(X_i;\theta_f)) = \delta^2(\sqrt{1 + ((Y(\partial Y(p)) - f(\partial Y(p)))/\delta)^2} - 1)$$ (8)

where $l_{\partial-PHL}$, is he pseudo Huber loss, Y represents the ground truth segmentation, $Y(\partial_Y(p))$ represents the value of the ground truth segmentation at a boundary pixel ($\partial_Y$) location (or point) p in the ground truth frame, $f(\partial_Y(p))$ represents the segmentation network output at the corresponding boundary pixel location, and $\delta$ is a steepness parameter. For example, relaxed Jaccard is similar to an intersection over union metric that provides less loss when the segmented regions of interest have better overlap. As shown, the pseudo Huber loss includes differences between ground truth values for ground truth boundary points corresponding to a training object of interest ($Y(\partial_Y(p))$) and resultant values for the boundary points corresponding to application of the segmentation convolutional neural network during training ($f(\partial_Y(p))$). Furthermore, the boundary loss term includes a square of a fraction of the difference over a steepness parameter $(((Y(\partial_Y(p)) - f(\partial_Y(p)))/\delta^2))$, the steepness parameter to penalize boundary segmentation errors in the segmentation convolutional neural network. The steepness parameter may be any value and may be determined using heuristic techniques.

As discussed, the total loss may be determined based on summing the discussed loss terms.

Processing continues at operation 1005, where the loss is propagated through the segmentation network. The loss may be propagated through the segmentation network using any suitable technique or techniques such as back propagation techniques. Notably, the weights and the parameters of the segmentation network may be adjusted based on the loss to generate a now current segmentation network.

Processing continues at decision operation 1006, where a determination is made as to whether convergence of the segmentation network has been attained. The convergence decision may be made using any suitable technique or techniques such as a total loss of the segmentation network being less than a predetermined threshold, a maximum number of training epochs being performed, etc. If convergence has not been met, processing continues at operations 1003-1006 until convergence is attained.

After convergence has been attained, processing continues at operation 1007, where the weights and parameters of the segmentation network are stored to memory for application via a system such as system 100 or any other system of device discussed herein.

Figure 11:
FIG. 11 illustrates an example input video frame for segmentation and a corresponding resultant segmentation.
Figure 11:

FIG. 11 illustrates example an input video frame 1101 for segmentation and a corresponding resultant segmentation 1102, arranged in accordance with at least some implementations of the present disclosure. Notably, segmentation 1102 may be generated using the techniques discussed herein. In the examples of FIG. 11, segmentation 1102 illustrates a binary mask with white representative of an object of interest and black representative of a background as discussed herein. As shown, segmentation 1102 faithfully represent the object of interest (in this case the object of interest is a combination of a rider and motorcycle) in input video frame 1101. Furthermore, resultant segmentation 1102 yields high fidelity segmentation results with smooth and accurate boundary contours and temporally coherence from frame to frame throughout video (both in terms of fidelity and reduced chatter).

The discussed techniques provide improved semantic segmentation in video including optional use of 2K inference (for enhanced resolution), low user input segmentation (e.g., only requiring positive and negative clicks on a first frame of a video sequence) with automation based on projection of the initial user input, an application driven tensor decomposition as applied to features extracted from a classification CNN for reduced memory usage and computational complexity, implementation of a boundary loss function to render segmentations with high quality boundary contours, and improved temporal coherence via use of motion data such as optical flow data.

Figure 12:
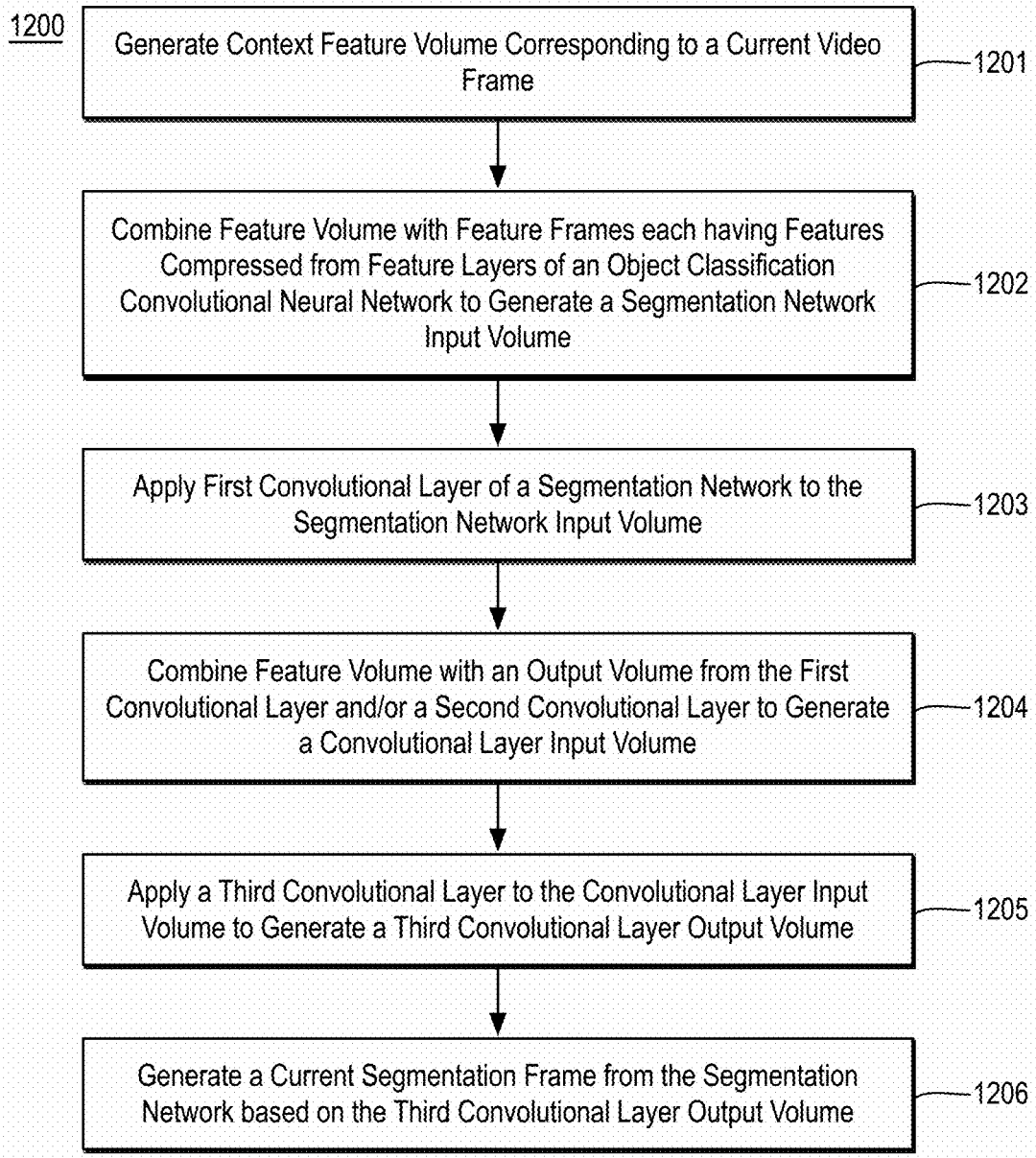
FIG. 12 is a flow diagram illustrating an example process for providing segmentation in video using a segmentation network employing context aware connections.

FIG. 12 is a flow diagram illustrating an example process 1200 for providing segmentation in video using a segmentation network employing context aware connections, arranged in accordance with at least some implementations of the present disclosure. Process 1200 may include one or more operations 1201-1206 as illustrated in FIG. 12. Process 1200 may form at least part of a video segmentation process. As used herein, the term video segmentation indicates segmenting one or more video frames of the video such that each pixel (or small pixel regions) of the video frames include probabilities of whether the pixel is within a particular region (e.g., object of interest region, primary region, etc.) of the video frame. By way of non-limiting example, process 1200 may form at least part of a video segmentation process performed by system 100 as discussed herein during an implementation or inference phase.

Figure 13:
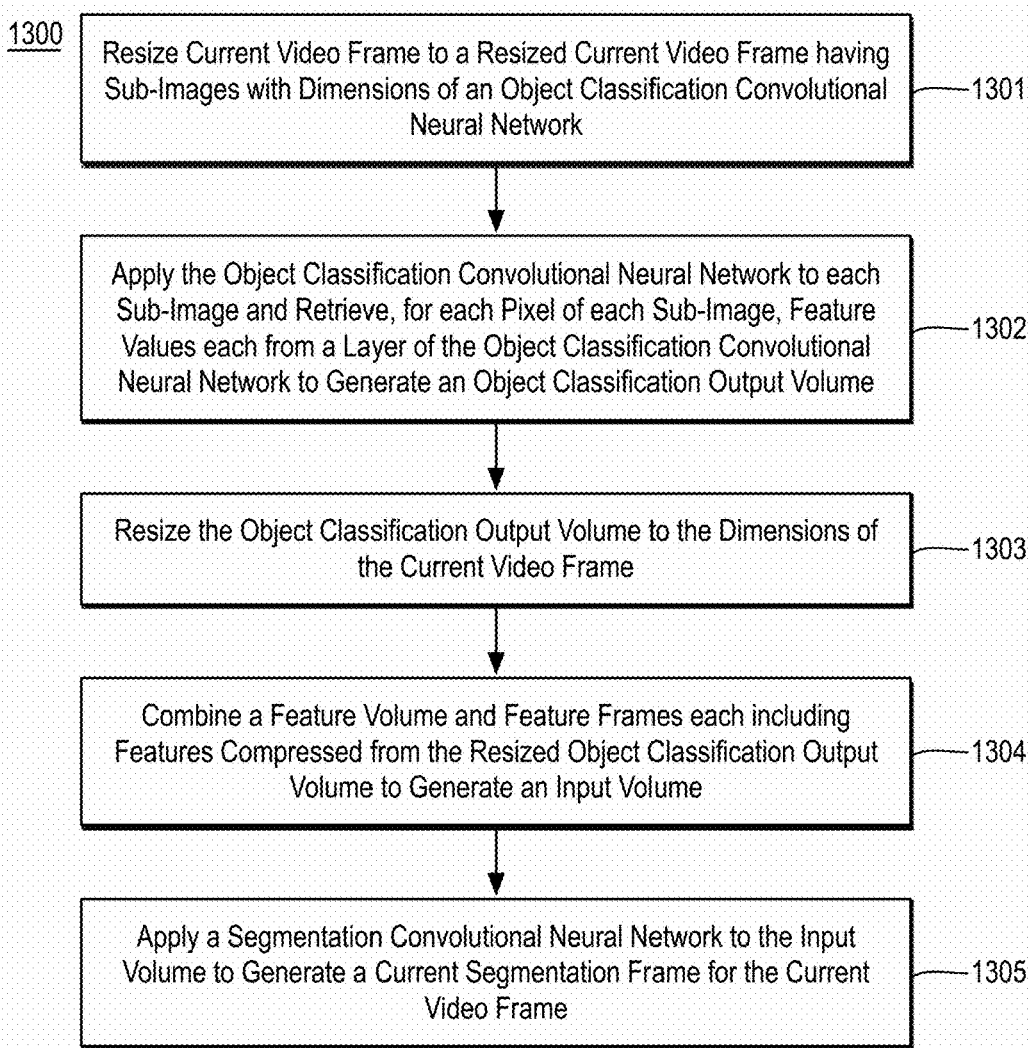
FIG. 13 is a flow diagram illustrating an example process for providing segmentation in video using tessellation techniques.

FIG. 13 is a flow diagram illustrating an example process 1300 for providing segmentation in video using tessellation techniques, arranged in accordance with at least some implementations of the present disclosure. Process 1300 may include one or more operations 1301-1305 as illustrated in FIG. 13. Process 1300 may form at least part of a video segmentation process. By way of non-limiting example, process 1300 may form at least part of a video segmentation process performed by system 100 as discussed herein during an implementation or inference phase.

Figure 14:
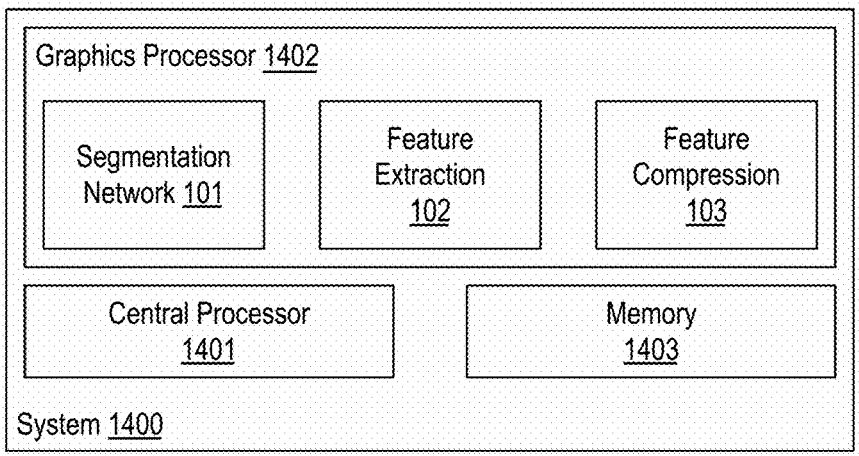
FIG. 14 is an illustrative diagram of an example system for providing segmentation in video.

Furthermore, process 1200 and/or process 1300 may be performed by system 1400 of FIG. 14. Notably, operations or features of processes 1200,1300 may be employed separately or in conjunction with one another.

FIG. 14 is an illustrative diagram of an example system 1400 for providing segmentation in video, arranged in accordance with at least some implementations of the present disclosure. As shown in FIG. 14, system 1400 may include one or more central processing units (CPU) 1401 (i.e., central processor(s)), a graphics processing unit 1402 (i.e., graphics processor), and memory stores 1403. Also as shown, graphics processing unit 1402 may include or implement segmentation network 101, feature extraction module 102, and feature compression module 103. Such modules or components may be implemented to perform operations as discussed herein. In the example of system 1400, memory stores 1403 may store video frame data, motion data, segmentation data, feature frame data, user input data, object of interest indicator or background indicator frame data, positive or negative distance transform frame data, feature map data, CNN parameters or weights, or any other data or data structure discussed herein.

As shown, in some examples, segmentation network 101, feature extraction module 102, and feature compression module 103 are implemented via graphics processing unit 1402. In other examples, one or more or portions of segmentation network 101, feature extraction module 102, and feature compression module 103 are implemented via central processing units 1401 or an image processing unit (not shown) of system 1400. In yet other examples, one or more or portions of segmentation network 101, feature extraction module 102, and feature compression module 103 may be implemented via an imaging processing pipeline, graphics pipeline, or the like.

Graphics processing unit 1402 may include any number and type of graphics processing units that may provide the operations as discussed herein. Such operations may be implemented via software or hardware or a combination thereof. For example, graphics processing unit 1402 may include circuitry dedicated to manipulate video data, CNN data, etc. obtained from memory stores 1403. Central processing units 1401 may include any number and type of processing units or modules that may provide control and other high level functions for system 1400 and/or provide any operations as discussed herein. Memory stores 1403 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory stores 1403 may be implemented by cache memory. In an embodiment, one or more or portions of segmentation network 101, feature extraction module 102, and feature compression module 103 are implemented via an execution unit (EU) of graphics processing unit 1402. The EU may include, for example, programmable logic or circuitry such as a logic core or cores that may provide a wide array of programmable logic functions. In an embodiment, one or more or portions of segmentation network 101, feature extraction module 102, and feature compression module 103 are implemented via dedicated hardware such as fixed function circuitry or the like. Fixed function circuitry may include dedicated logic or circuitry and may provide a set of fixed function entry points that may map to the dedicated logic for a fixed purpose or function. In some embodiments, one or more or portions of segmentation network 101, feature extraction module 102, and feature compression module 103 are implemented via an application specific integrated circuit (ASIC). The ASIC may include an integrated circuitry customized to perform the operations discussed herein.

Returning to discussion of FIG. 12, process 1200 begins at operation 1201, where a feature volume corresponding to a current video frame is generated. The feature volume or context feature volume may include any combination of the current video frame, a previous video frame, a motion frame, a previous segmentation frame, an object of interest indicator frame, a background indicator frame, a positive distance transform frame, and a negative distance transform frame. In an embodiment, the feature volume includes the current video frame and one or more of a temporally previous video frame, a temporally previous segmentation frame, or an object of interest indicator frame including one or more indicators of an object of interest in the current video frame. In an embodiment, the feature volume includes the current video frame, the temporally previous video frame, the temporally previous segmentation frame, and the object of interest indicator frame. In an embodiment, the one or more indicators of the object of interest indicator frame indicate locations of positive indicators indicative of the object of interest, and the feature volume further includes a background indicator frame including negative indicators indicative of locations of a background exclusive of the object of interest, a positive distance transform frame comprising, for each pixel thereof, a value indicative of a minimum distance to any of the locations of the positive indicators, and a negative distance transform frame comprising, for each pixel thereof, a value indicative of a minimum distance to any of the locations of the negative indicators.

Processing continues at operation 1202, where the feature volume is combined with multiple feature frames each including features compressed from feature layers of a convolutional neural network as applied to the current video frame to generate a segmentation network input volume. In some embodiments, the convolutional neural network is applied to the current video frame to generate a CNN feature volume that is then compressed to provide the feature frames. In some embodiments, the convolutional neural network is applied to sub-images from a resized version of the current video frame to generate a CNN feature volume that is then compressed to provide the feature frames. In an embodiment, the feature frames are generated by resizing the current video frame to a resized current video frame including multiple sub-images each having dimensions corresponding to dimensions of the object classification convolutional neural network, applying the convolutional neural network to each of the sub-images, retrieving, for each pixel of each of the sub-images, multiple feature values each from one of the layers of the convolutional neural network to generate a hypercolumn of feature values for each pixel, and compressing the hypercolumns of feature values to determine the plurality of feature frames. In an embodiment, compressing the hypercolumns comprises applying Tucker decomposition to a feature volume comprising the hypercolumns to determine a core tensor comprising the plurality of compressed feature frames.

Processing continues at operation 1203, where a first convolutional layer of multiple convolutional layers of a segmentation network is applied to the segmentation network input volume. The segmentation network may include any number of convolutional layers with the first convolutional layer receiving the segmentation network input volume for processing. For example, the first convolutional layer may generate a corresponding convolutional layer output volume based on the segmentation network input volume.

Processing continues at operation 1204, where the feature volume is combined with a convolutional layer output volume from the first convolutional layer or a second convolutional layer of the convolutional layers to generate a convolutional layer input volume. Notably, the feature volume may be combined with an output volume from one, some, or all convolutional layers prior to the final convolutional layer. Then, the subsequent convolutional layer receives the combined volume (i.e., a convolutional layer input volume) for processing at the subsequent convolutional layer. In some embodiments, the feature volume is combined with a corresponding output volume from each non-final convolutional layer of the convolutional layers to generate a corresponding convolutional layer input volume for each subsequent convolutional layer of the convolutional layers. That is, each layer of the segmentation network except for the first layer may process a concatenation of an output volume from an immediately preceding layer and the feature volume. In some embodiments, combining the feature volume and the convolutional layer output volume from the first convolutional layer or the second convolutional layer includes concatenating the feature volume and the output volume such that the feature volume and the convolutional layer output volume have the same resolution. In some embodiments, the second convolutional layer input volume consists of the feature volume and the convolutional layer output volume from the first convolutional layer or the second convolutional layer and is absent any convolutional layer output volume from any other convolutional layer of the segmentation network.

Processing continues at operation 1205, where a third convolutional layer of the convolutional layers is applied to the convolutional layer input volume to generate a second convolutional layer output volume. Notably, the third convolutional layer may be immediately subsequent to the first convolutional layer (i.e., the first layer in the segmentation network and the layer that processed the segmentation network input volume) or another convolutional layer (i.e., a layer other than the first convolutional layer). As discussed, in some embodiments, each layer of the segmentation network except for the first layer may process a concatenation of an output volume from an immediately preceding layer and the feature volume. In other embodiments, not all layers of the segmentation network except for the first layer process a combination of an output volume from an immediately preceding layer and the feature volume. That is, some layers may not implement the context aware skip connections.

Processing continues at operation 1206, where a current segmentation frame from the segmentation network based on the second convolutional layer output volume. For example, the second convolutional layer output volume may be passed to a subsequent convolutional layer of the segmentation network (and optionally concatenated with the feature volume) and such processing may proceed through a final convolutional layer of the segmentation network, which provides a resultant segmentation or multiple resultant candidate segmentations corresponding to the current video frame.

Process 1200 may provide for generation of one or more segmentations for a current video frame. Process 1200 may be repeated any number of times either in series or in parallel for any number of video frames, video sequences, etc.

Turning now to discussion of FIG. 13, process 1300 begins at operation 1301, where a current video frame is resized to a resized current video frame having multiple sub-images each with dimensions corresponding to dimensions of an object classification convolutional neural network. That is, each sub-image has a size or resolution (e.g., height and width) equal to an input resolution of the object classification convolutional neural network. In some embodiments, the size or resolution of the resized current video frame may be determined such that the resolution of the resized current video frame has a width equal to a product of an input width of the object classification convolutional neural network and an output from a ceiling function applied to a ratio of a width of the current video frame to the input width of the object classification convolutional neural network and a height equal to a product of an input height of the object classification convolutional neural network and an output from a ceiling function applied to a ratio of a height of the current video frame to the input height of the object classification convolutional neural network. Thereby, the resized current video frame includes a discrete whole number of sub-images each having dimensions suitable for processing by the object classification convolutional neural network. In some embodiments, the resized current video frame consists of a grid of the sub-images.

Processing continues at operation 1302, where the object classification convolutional neural network is applied to each of the sub-images and, for each pixel of each of the sub-images, multiple feature values are retrieved, each from one of the layers of the object classification convolutional neural network, to generate an object classification output volume. For example, the object classification output volume may include a number of feature maps each having a feature value for a pixel of the resized current video frame such that each feature map is attained or retrieved from a particular convolutional layer output volume of the object classification convolutional neural network. Notably, any number of such feature maps may come from any number of convolutional layers. In some embodiments, all feature maps are attained from each of the convolutional layers. In other embodiments, select feature maps are retrieved. In some embodiments, feature volumes (e.g., having a hypercolumn of features for each pixel) corresponding to the sub-images are merged to determine the object classification output volume (e.g., having a hypercolumn of features for each pixel) for the resized current video frame. In some embodiments, such sub-image processing by the object classification convolutional neural network is performed in parallel for two or more sub-images. In some embodiments, applying the object classification convolutional neural network to each of the sub-images includes applying the object classification to a first sub-image and a second sub-image in parallel.

Processing continues at operation 1303, where the object classification output volume is resized to the dimensions of the current video frame. For example, the object classification output volume may be downsampled or downsized to the dimensions the current video frame, which was upsampled to the resized current video frame. Notably, the depth of the object classification output volume is not modified in such processing.

Processing continues at operation 1304, where a feature volume corresponding to the current video frame is combined with feature frames each including features compressed from the resized object classification output volume generated at operation 1303 to generate an input volume. As discussed herein, the feature volume or context feature volume may include any combination of context features from the current video frame such as the current video frame, a temporally previous video frame, a temporally previous segmentation frame, an object of interest indicator frame, a background indicator frame, a positive distance transform frame, a negative distance transform frame, and a motion frame. In some embodiments, the feature volume includes the current video frame, a temporally previous video frame, a temporally previous segmentation frame, and an object of interest indicator frame comprising one or more indicators of an object of interest in the current video frame. The feature volume is combined with a compressed object classification output volume, which may be compressed from the object classification output volume using any suitable technique or techniques such as Tucker decomposition techniques as discussed herein. The resultant input volume is suitable for processing by a segmentation network as discussed herein and may be characterized as a segmentation network input volume, a segmentation network input feature volume, or the like.

Processing continues at operation 1305, where a segmentation convolutional neural network is applied to the input volume to generate a current segmentation frame for the current video frame. In some embodiments, the segmentation convolutional neural network implements context aware skip connections as discussed herein. In some embodiments, the segmentation convolutional neural network is a feed forward only network without such context aware skip connections. The segmentation convolutional neural network provides a resultant segmentation or multiple resultant candidate segmentations corresponding to the current video frame.

Process 1300 may provide for generation of one or more segmentations for a current video frame. Process 1300 may be repeated any number of times either in series or in parallel for any number of video frames, video sequences, etc.

Various components of the systems described herein may be implemented in software, firmware, and/or hardware and/or any combination thereof. For example, various components of devices or systems discussed herein may be provided, at least in part, by hardware of a computing System-on-a-Chip (SoC) such as may be found in a computing system such as, for example, a computer, a laptop computer, a tablet, or a smart phone. For example, such components or modules may be implemented via a multi-core SoC processor. Those skilled in the art may recognize that systems described herein may include additional components that have not been depicted in the corresponding figures.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the discussed operations, modules, or components discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 15:
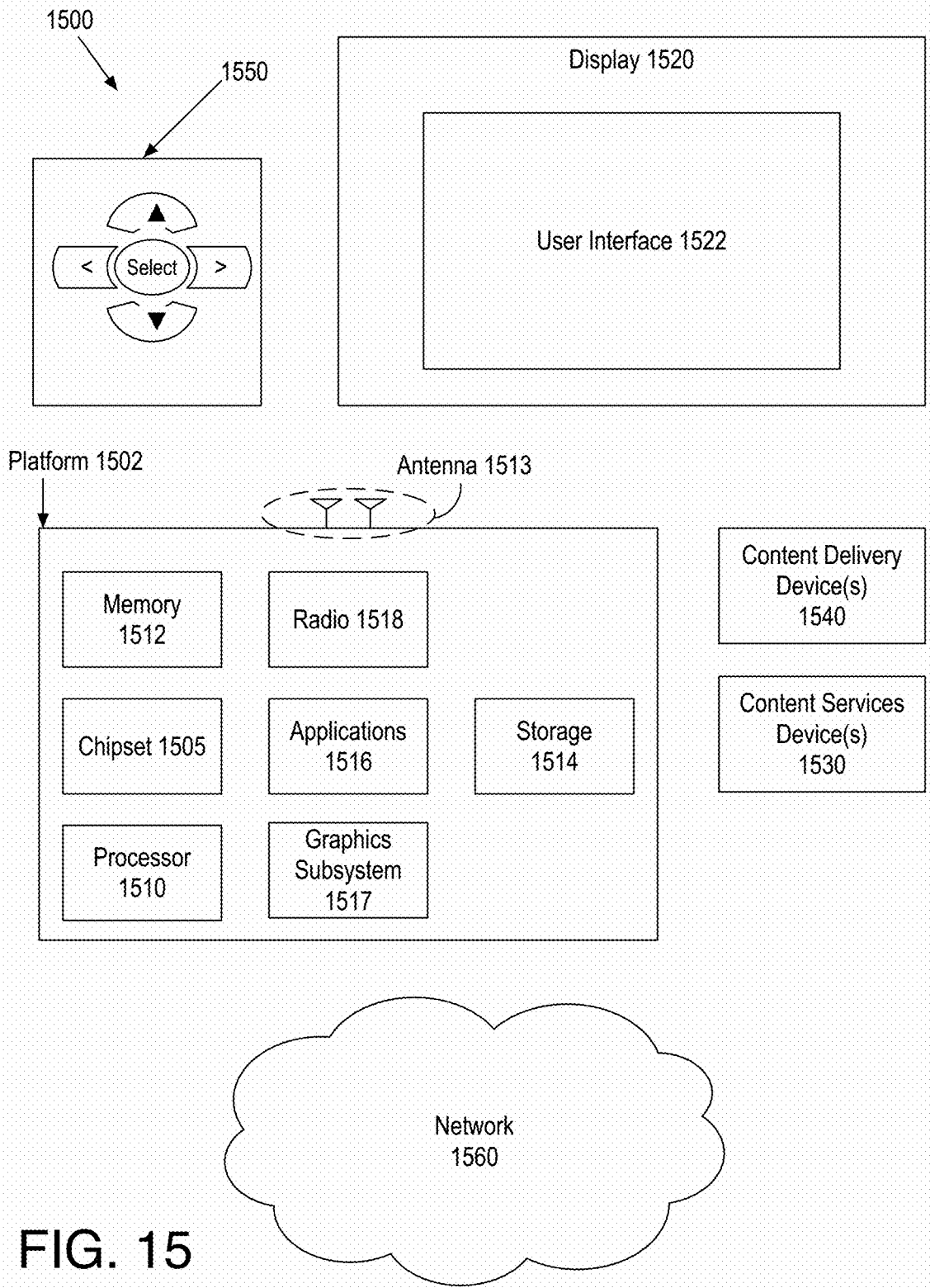
FIG. 15 is an illustrative diagram of an example system.

FIG. 15 is an illustrative diagram of an example system 1500, arranged in accordance with at least some implementations of the present disclosure. In various implementations, system 1500 may be a computing system although system 1500 is not limited to this context. For example, system 1500 may be incorporated into a personal computer (PC), laptop computer, ultra-laptop computer, tablet, phablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, peripheral device, gaming console, wearable device, display device, all-in-one device, two-in-one device, and so forth.

In various implementations, system 1500 includes a platform 1502 coupled to a display 1520. Platform 1502 may receive content from a content device such as content services device(s) 1530 or content delivery device(s) 1540 or other similar content sources such as a camera or camera module or the like. A navigation controller 1550 including one or more navigation features may be used to interact with, for example, platform 1502 and/or display 1520. Each of these components is described in greater detail below.

In various implementations, platform 1502 may include any combination of a chipset 1505, processor 1510, memory 1512, antenna 1513, storage 1514, graphics subsystem 1517, applications 1516 and/or radio 1518. Chipset 1505 may provide intercommunication among processor 1510, memory 1512, storage 1514, graphics subsystem 1517, applications 1516 and/or radio 1518. For example, chipset 1505 may include a storage adapter (not depicted) capable of providing intercommunication with storage 1514.

Processor 1510 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1510 may be dual-core processor(s), dual-core mobile processor(s), and so forth.

Memory 1512 may be implemented as a volatile memory device such as, but not limited to, a Random Access Memory (RAM), Dynamic Random Access Memory (DRAM), or Static RAM (SRAM).

Storage 1514 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1514 may include technology to increase the storage performance enhanced protection for valuable digital media when multiple hard drives are included, for example.

Graphics subsystem 1517 may perform processing of images such as still images, graphics, or video for display. Graphics subsystem 1517 may be a graphics processing unit (GPU), a visual processing unit (VPU), or an image processing unit, for example. In some examples, graphics subsystem 1517 may perform scanned image rendering as discussed herein. An analog or digital interface may be used to communicatively couple graphics subsystem 1517 and display 1520. For example, the interface may be any of a High-Definition Multimedia Interface, DisplayPort, wireless HDMI, and/or wireless HD compliant techniques. Graphics subsystem 1517 may be integrated into processor 1510 or chipset 1505. In some implementations, graphics subsystem 1517 may be a stand-alone device communicatively coupled to chipset 1505.

The image processing techniques described herein may be implemented in various hardware architectures. For example, image processing functionality may be integrated within a chipset. Alternatively, a discrete graphics and/or image processor and/or application specific integrated circuit may be used. As still another implementation, the image processing may be provided by a general purpose processor, including a multi-core processor. In further embodiments, the functions may be implemented in a consumer electronics device.

Radio 1518 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1518 may operate in accordance with one or more applicable standards in any version.

In various implementations, display 1520 may include any flat panel monitor or display. Display 1520 may include, for example, a computer display screen, touch screen display, video monitor, television-like device, and/or a television. Display 1520 may be digital and/or analog. In various implementations, display 1520 may be a holographic display. Also, display 1520 may be a transparent surface that may receive a visual projection. Such projections may convey various forms of information, images, and/or objects. For example, such projections may be a visual overlay for a mobile augmented reality (MAR) application. Under the control of one or more software applications 1516, platform 1502 may display user interface 1522 on display 1520.

In various implementations, content services device(s) 1530 may be hosted by any national, international and/or independent service and thus accessible to platform 1502 via the Internet, for example. Content services device(s) 1530 may be coupled to platform 1502 and/or to display 1520. Platform 1502 and/or content services device(s) 1530 may be coupled to a network 1560 to communicate (e.g., send and/or receive) media information to and from network 1560. Content delivery device(s) 1540 also may be coupled to platform 1502 and/or to display 1520.

In various implementations, content services device(s) 1530 may include a cable television box, personal computer, network, telephone, Internet enabled devices or appliance capable of delivering digital information and/or content, and any other similar device capable of uni-directionally or bi-directionally communicating content between content providers and platform 1502 and/display 1520, via network 1560 or directly. It will be appreciated that the content may be communicated uni-directionally and/or bi-directionally to and from any one of the components in system 1500 and a content provider via network 1560. Examples of content may include any media information including, for example, video, music, medical and gaming information, and so forth.

Content services device(s) 1530 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1502 may receive control signals from navigation controller 1550 having one or more navigation features. The navigation features of navigation controller 1550 may be used to interact with user interface 1522, for example. In various embodiments, navigation controller 1550 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 1550 may be replicated on a display (e.g., display 1520) by movements of a pointer, cursor, focus ring, or other visual indicators displayed on the display. For example, under the control of software applications 1516, the navigation features located on navigation controller 1550 may be mapped to virtual navigation features displayed on user interface 1522, for example. In various embodiments, navigation controller 1550 may not be a separate component but may be integrated into platform 1502 and/or display 1520. The present disclosure, however, is not limited to the elements or in the context shown or described herein.

In various implementations, drivers (not shown) may include technology to enable users to instantly turn on and off platform 1502 like a television with the touch of a button after initial boot-up, when enabled, for example. Program logic may allow platform 1502 to stream content to media adaptors or other content services device(s) 1530 or content delivery device(s) 1540 even when the platform is turned "off." In addition, chipset 1505 may include hardware and/or software support for 5.1 surround sound audio and/or high definition 7.1 surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 1500 may be integrated. For example, platform 1502 and content services device(s) 1530 may be integrated, or platform 1502 and content delivery device(s) 1540 may be integrated, or platform 1502, content services device(s) 1530, and content delivery device(s) 1540 may be integrated, for example. In various embodiments, platform 1502 and display 1520 may be an integrated unit. Display 1520 and content service device(s) 1530 may be integrated, or display 1520 and content delivery device(s) 1540 may be integrated, for example. These examples are not meant to limit the present disclosure.

In various embodiments, system 1500 may be implemented as a wireless system, a wired system, or a combination of both. When implemented as a wireless system, system 1500 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1500 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1502 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 15.

Figure 16:
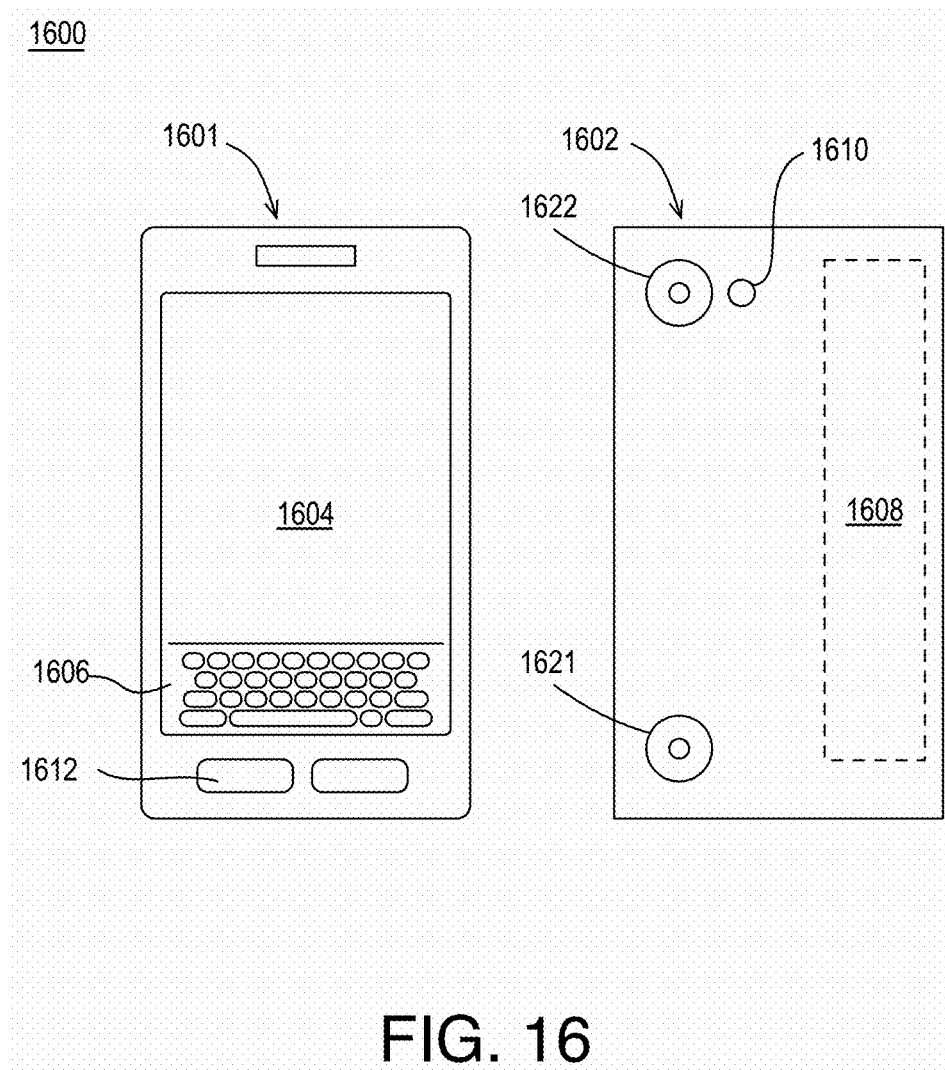
FIG. 16 illustrates an example device, all arranged in accordance with at least some implementations of the present disclosure.

As described above, system 1500 may be embodied in varying physical styles or form factors. FIG. 16 illustrates an example small form factor device 1600, arranged in accordance with at least some implementations of the present disclosure. In some examples, system 1500 may be implemented via device 1600. In other examples, other systems, components, or modules discussed herein or portions thereof may be implemented via device 1600. In various embodiments, for example, device 1600 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smartphone, smart tablet or smart mobile television), mobile internet device (MID), messaging device, data communication device, cameras (e.g. point-and-shoot cameras, super-zoom cameras, digital single-lens reflex (DSLR) cameras), and so forth.

Examples of a mobile computing device also may include computers that are arranged to be implemented by a motor vehicle or robot, or worn by a person, such as wrist computers, finger computers, ring computers, eyeglass computers, belt-clip computers, arm-band computers, shoe computers, clothing computers, and other wearable computers. In various embodiments, for example, a mobile computing device may be implemented as a smartphone capable of executing computer applications, as well as voice communications and/or data communications. Although some embodiments may be described with a mobile computing device implemented as a smartphone by way of example, it may be appreciated that other embodiments may be implemented using other wireless mobile computing devices as well. The embodiments are not limited in this context.

As shown in FIG. 16, device 1600 may include a housing with a front 1601 and a back 1602. Device 1600 includes a display 1604, an input/output (I/O) device 1606, a color camera 1621, a color camera 1622, and an integrated antenna 1608. For example, color camera 1621 and color camera 1622 and may input image data (e.g., left and right images) as discussed herein. Device 1600 also may include navigation features 1612. I/O device 1606 may include any suitable I/O device for entering information into a mobile computing device. Examples for I/O device 1606 may include an alphanumeric keyboard, a numeric keypad, a touch pad, input keys, buttons, switches, microphones, speakers, voice recognition device and software, and so forth. Information also may be entered into device 1600 by way of microphone (not shown), or may be digitized by a voice recognition device. As shown, device 1600 may include color cameras 1621, 1622, and a flash 1610 integrated into back 1602 (or elsewhere) of device 1600. In other examples, color cameras 1621, 1622, and flash 1610 may be integrated into front 1601 of device 1600 or both front and back sets of cameras may be provided. Color cameras 1621, 1622 and a flash 1610 may be components of a camera module to originate color image data that may be processed into an image or streaming video that is output to display 1604 and/or communicated remotely from device 1600 via antenna 1608 for example.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

In one or more first embodiments, a method for providing segmentation in video comprises generating a feature volume corresponding to a current video frame, the feature volume comprising the current video frame and at least one of a temporally previous video frame, a temporally previous segmentation frame, or an object of interest indicator frame comprising one or more indicators of an object of interest in the current video frame, combining the feature volume with a plurality of feature frames each comprising features compressed from feature layers of a convolutional neural network as applied to the current video frame to generate a segmentation network input volume, applying a first convolutional layer of a plurality of convolutional layers of a segmentation network to the segmentation network input volume, combining the feature volume with a convolutional layer output volume from the first convolutional layer or a second convolutional layer of the convolutional layers to generate a convolutional layer input volume, applying a third convolutional layer of the convolutional layers to the convolutional layer input volume to generate a second convolutional layer output volume, and generating a current segmentation frame from the segmentation network based on the second convolutional layer output volume.

In one or more second embodiments, further to the first embodiment, the method further comprises combining the feature volume with a corresponding output volume from each non-final convolutional layer of the convolutional layers to generate a corresponding convolutional layer input volume for each subsequent convolutional layer of the convolutional layers.

In one or more third embodiments, further to the first or second embodiments, combining the feature volume and the convolutional layer output volume from the first convolutional layer or the second convolutional layer comprises concatenating the feature volume and the output volume, wherein the feature volume and the convolutional layer output volume comprise the same resolution.

In one or more fourth embodiments, further to any of the first through third embodiments, the feature volume comprises the current video frame, the temporally previous video frame, the temporally previous segmentation frame, and the object of interest indicator frame.

In one or more fifth embodiments, further to any of the first through fourth embodiments, the one or more indicators of the object of interest indicator frame indicate locations of positive indicators indicative of the object of interest, the feature volume further comprising a background indicator frame comprising negative indicators indicative of locations of a background exclusive of the object of interest, a positive distance transform frame comprising, for each pixel thereof, a value indicative of a minimum distance to any of the locations of the positive indicators, and a negative distance transform frame comprising, for each pixel thereof, a value indicative of a minimum distance to any of the locations of the negative indicators.

In one or more sixth embodiments, further to any of the first through fifth embodiments, the second convolutional layer input volume consists of the feature volume and the convolutional layer output volume from the first convolutional layer or the second convolutional layer and is absent any convolutional layer output volume from any other convolutional layer of the segmentation network.

In one or more seventh embodiments, further to any of the first through sixth embodiments, the method further comprises generating the feature frames by resizing the current video frame to a resized current video frame comprising a plurality of sub-images each having dimensions corresponding to dimensions of the object classification convolutional neural network, applying the convolutional neural network to each of the sub-images, retrieving, for each pixel of each of the sub-images, a plurality of feature values each from one of the layers of the convolutional neural network to generate a hypercolumn of feature values for each pixel, and compressing the hypercolumns of feature values to determine the plurality of feature frames.

In one or more eighth embodiments, further to any of the first through seventh embodiments, compressing the hypercolumns comprises applying Tucker decomposition to a feature volume comprising the hypercolumns to determine a core tensor comprising the plurality of compressed feature frames.

In one or more ninth embodiments, a method for providing segmentation in video comprises resizing a current video frame to a resized current video frame comprising a plurality of sub-images each having dimensions corresponding to dimensions of an object classification convolutional neural network, applying the object classification convolutional neural network to each of the sub-images and retrieving, for each pixel of each of the sub-images, a plurality of feature values each from one of the layers of the object classification convolutional neural network to generate an object classification output volume, resizing the object classification output volume to dimensions of the current video frame, combining a feature volume comprising at least the current video frame with a plurality of feature frames each comprising features compressed from the resized object classification output volume to generate an input volume, and applying a segmentation convolutional neural network to the input volume to generate a current segmentation frame for the current video frame.

In one or more tenth embodiments, further to the ninth embodiment, a resolution of the resized current video frame has a width comprising a product of an input width of the object classification convolutional neural network and an output from a ceiling function applied to a ratio of a width of the current video frame to the input width of the object classification convolutional neural network.

In one or more eleventh embodiments, further to the ninth or tenth embodiments, the resized current video frame consists of a grid of the sub-images.

In one or more twelfth embodiments, further to any of the ninth through eleventh embodiments, the feature volume further comprises a temporally previous video frame, a temporally previous segmentation frame, and an object of interest indicator frame comprising one or more indicators of an object of interest in the current video frame.

In one or more thirteenth embodiments, further to any of the ninth through twelfth embodiments, applying the object classification convolutional neural network to each of the sub-images comprises applying the object classification to a first sub-image and a second sub-image in parallel.

In one or more fourteenth embodiments, a device or system includes a memory and a processor to perform a method according to any one of the above embodiments.

In one or more fifteenth embodiments, at least one machine readable medium includes a plurality of instructions that in response to being executed on a computing device, cause the computing device to perform a method according to any one of the above embodiments.

In one or more sixteenth embodiments, an apparatus includes means for performing a method according to any one of the above embodiments.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A system for providing segmentation in video, the system comprising:
    a memory to store a current video frame;
    machine-readable instructions; and
    at least one processor circuit to be programmed based on the machine-readable instructions to:
        resize the current video frame to a resized current video frame, the resized current video frame including a plurality of sub-images having dimensions corresponding to dimensions of an object classification convolutional neural network;
        apply the object classification convolutional neural network to the sub-images and retrieve, for each pixel of each of the sub-images, a plurality of feature values each from one of a plurality of layers of the object classification convolutional neural network to generate an object classification output volume;
        resize the object classification output volume to dimensions of the current video frame;
        combine a feature volume with a plurality of feature frames each including features compressed from the resized object classification output volume to generate an input volume, the feature volume including at least the current video frame, a temporally previous video frame, a temporally previous segmentation frame, and an object of interest indicator frame, the object of interest indicator frame including one or more indicators of an object of interest in the current video frame; and apply a segmentation convolutional neural network to the input volume to generate a current segmentation frame for the current video frame.

2. The system of claim 1, wherein a resolution of the resized current video frame has a width based on a product of an input width of the object classification convolutional neural network and an output from a ceiling function applied to a ratio of a width of the current video frame to the input width of the object classification convolutional neural network.

3. The system of claim 1, wherein the resized current video frame includes a grid of the sub-images.

4. The system of claim 1, wherein one or more of the at least one processor circuit is to apply the object classification convolutional neural network to a first sub-image and a second sub-image of the sub-images in parallel.

5. The system of claim 1, wherein one or more of the at least one processor circuit is to upsample the current video frame based on one or more interpolation techniques to resize the current video frame.

6. A method for providing segmentation in video, the method comprising:
resizing a current video frame to a resized current video frame, the resized current video frame including a plurality of sub-images having dimensions corresponding to dimensions of an object classification convolutional neural network;
applying the object classification convolutional neural network to the sub-images and retrieving, for each pixel of each of the sub-images, a plurality of feature values each from one of a plurality of layers of the object classification convolutional neural network to generate an object classification output volume;
resizing the object classification output volume to dimensions of the current video frame;
combining a feature volume with a plurality of feature frames each including features compressed from the resized object classification output volume to generate an input volume, the feature volume including at least the current video frame, a temporally previous video frame, a temporally previous segmentation frame, and an object of interest indicator frame, the object of interest indicator frame including one or more indicators of an object of interest in the current video frame; and
applying a segmentation convolutional neural network to the input volume to generate a current segmentation frame for the current video frame.

7. The method of claim 6, wherein a resolution of the resized current video frame has a width based on a product of an input width of the object classification convolutional neural network and an output from a ceiling function applied to a ratio of a width of the current video frame to the input width of the object classification convolutional neural network.

8. The method of claim 6, wherein the resized current video frame includes a grid of the sub-images.

9. The method of claim 6, wherein the applying of the object classification convolutional neural network to the sub-images includes applying the object classification convolutional neural network to a first sub-image and a second sub-image of the sub-images in parallel.

10. The method of claim 6, wherein the resizing of the current video frame includes upsampling the current video frame based on one or more interpolation techniques.

11. At least one memory circuit comprising machine-readable instructions to cause a computing device to at least:
resize a current video frame to a resized current video frame, the resized current video frame including a plurality of sub-images having dimensions corresponding to dimensions of an object classification convolutional neural network;
apply the object classification convolutional neural network to the sub-images and retrieve, for each pixel of each of the sub-images, a plurality of feature values each from one of a plurality of layers of the object classification convolutional neural network to generate an object classification output volume;
resize the object classification output volume to dimensions of the current video frame;
combine a feature volume with a plurality of feature frames each including features compressed from the resized object classification output volume to generate an input volume, the feature volume including at least the current video frame, a temporally previous video frame, a temporally previous segmentation frame, and an object of interest indicator frame, the object of interest indicator frame including one or more indicators of an object of interest in the current video frame; and
apply a segmentation convolutional neural network to the input volume to generate a current segmentation frame for the current video frame.

12. The at least one memory circuit of claim 11, wherein a resolution of the resized current video frame has a width based on a product of an input width of the object classification convolutional neural network and an output from a ceiling function applied to a ratio of a width of the current video frame to the input width of the object classification convolutional neural network.

13. The at least one memory circuit of claim 11, wherein the resized current video frame includes a grid of the sub-images.

14. The at least one memory circuit of claim 11, wherein the machine-readable instructions are to cause the computing device to apply the object classification convolutional neural network to a first sub-image and a second sub-image of the sub-images in parallel.

15. The at least one memory circuit of claim 11, wherein the machine-readable instructions are to cause the computing device to upsample the current video frame based on one or more interpolation techniques to resize the current video frame.

* * * * *